United States Patent
Meyer

(10) Patent No.: US 11,731,526 B2
(45) Date of Patent: Aug. 22, 2023

(54) SYSTEMS AND METHODS FOR IDENTIFYING CHARACTERISTICS OF ELECTRIC VEHICLES

(71) Applicant: Volta Charging, LLC, San Francisco, CA (US)

(72) Inventor: Ramsey Rolland Meyer, San Francisco, CA (US)

(73) Assignee: Volta Charging, LLC, San Francisco, CA (US)

( * ) Notice: Subject to any disclaimer, the term of this patent is extended or adjusted under 35 U.S.C. 154(b) by 254 days.

(21) Appl. No.: 17/332,742

(22) Filed: May 27, 2021

(65) Prior Publication Data

US 2021/0394636 A1 Dec. 23, 2021

Related U.S. Application Data

(60) Provisional application No. 63/042,422, filed on Jun. 22, 2020.

(51) Int. Cl.
*B60L 53/65* (2019.01)
*B60L 53/66* (2019.01)
(Continued)

(52) U.S. Cl.
CPC .............. *B60L 53/65* (2019.02); *B60L 53/66* (2019.02); *G06N 3/08* (2013.01); *G06V 20/10* (2022.01);
(Continued)

(58) Field of Classification Search
CPC ...... B60L 53/65; B60L 53/66; B60L 2240/72; B60L 2260/46; B60L 53/14;
(Continued)

(56) References Cited

U.S. PATENT DOCUMENTS

| 10,025,950 B1 | 7/2018 | Avasarala et al. |
| 2016/0042401 A1 | 2/2016 | Menendez et al. |
| 2019/0031038 A1* | 1/2019 | Pursifull ................. B60L 53/65 |

FOREIGN PATENT DOCUMENTS

WO   WO 2020/036490 A1   2/2020

OTHER PUBLICATIONS

Volta Charging, LLC, International Search Report and Written Opinion, PCT/US2021/037171, dated Sep. 22, 2021, 13 pgs.

(Continued)

*Primary Examiner* — Paul Dinh
(74) *Attorney, Agent, or Firm* — Morgan, Lewis & Bockius LLP

(57) ABSTRACT

The disclosed embodiments provide a method performed at a computer system that is in communication with an electric vehicle charging station (EVCS). The EVCS includes a camera for obtaining images in a region proximal to the EVCS. The method includes capturing, using the camera, a plurality of images of electric vehicles, each image in the plurality of images being an image of a respective electric vehicle. The method further includes, for each respective image of the plurality of images of electric vehicles: determining, without user intervention, a characteristic of the respective electric vehicle; and tagging, without user intervention, the respective image with the characteristic of the respective electric vehicle. The method further includes training a first machine learning algorithm to identify the characteristic of other electric vehicles using the tagged plurality of images.

20 Claims, 29 Drawing Sheets

(51) Int. Cl.
*G06N 3/08* (2023.01)
*G06V 20/10* (2022.01)

(52) U.S. Cl.
CPC ...... *G06V 2201/08* (2022.01); *G06V 2201/10* (2022.01)

(58) Field of Classification Search
CPC ........ B60L 53/305; B60L 53/31; B60L 53/67; G06N 3/08; G06V 20/10; G06V 2201/08; G06V 2201/10; G06F 18/214; Y02T 10/70; Y02T 10/7072; Y02T 10/72; Y02T 90/12; Y02T 90/14; Y02T 90/16
USPC ....................................................... 320/109
See application file for complete search history.

(56) References Cited

OTHER PUBLICATIONS

Sheng Minglan et al., "Vehicle Detection and Classification Using Convolutional Neural Networks", 2018 IEEE 7$^{th}$ Data Driven Control and Learning Systems Conference (DDCLS), IEEE, XP033432617, May 25, 2018, 8 pgs.

Amir Nazemi et al., "Unsupervised Feature Learning Toward a Real-time Vehicle Make and Model Recognition", arxiv.org, Cornell University Library, 201 Olin Library Cornell University Ithaca, NY, XP080888488, Jun. 8, 2018, 15 pgs.

\* cited by examiner

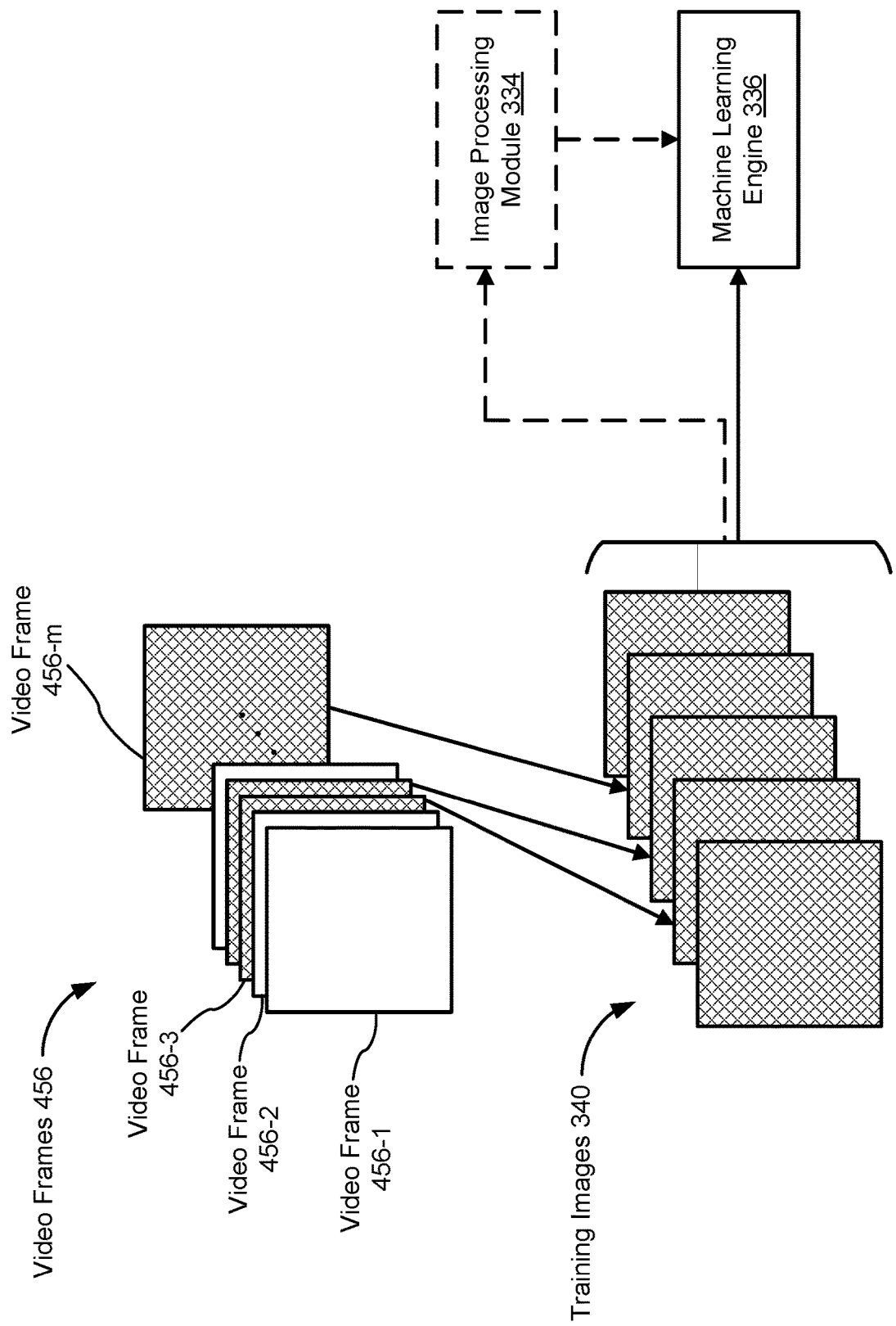

980 When the detected change in the status of the EVCS corresponds to a user action to begin charging an electric vehicle, identify frames of the video that are captured within a predetermined time period after the detected change. The subset of the plurality of frames includes at least one of the identified frames.

For each respective image of the plurality of images of electric vehicles (1006):

> Determine (1008), without user intervention, a characteristic of the respective electric vehicle.
>
> (A)
>
> | Determining the characteristic of the respective electric vehicle includes (1018), prior to training the first machine learning algorithm, providing the information received by the plurality of sensors to a second machine learning algorithm, wherein the second machine learning algorithm is configured to output the characteristic of the respective electric vehicle.
>
> | The characteristic of the respective electric vehicle is determined (1020), in response to a user initiating a charging process at the EVCS, using information from an account associated with the user.
>
> Tag (1022), without user intervention, the respective image with the characteristic of the respective electric vehicle.

SYSTEMS AND METHODS FOR IDENTIFYING CHARACTERISTICS OF ELECTRIC VEHICLES

RELATED APPLICATIONS

This application claims priority to U.S. Provisional Patent App. No. 63/042,422, filed Jun. 22, 2020, which is hereby incorporated by reference in its entirety.

TECHNICAL FIELD

This application relates generally to identifying characteristics of electric vehicles using electric vehicle charging stations, and more particularly, to training neural networks with images obtained from an electric vehicle charging station.

BACKGROUND

Image recognition using machine learning models is an extremely powerful tool for a wide variety of applications. Machine learning models are typically trained using a training dataset consisting of tagged data (e.g., tagged images). For example, the MNIST database (Modified National Institute of Standards and Technology database) is a large database of handwritten characters that is commonly used to train neural networks to recognize handwritten characters. To produce a reliable model, more training data is better. In the example above, the MNIST database is effective because it includes a large variety of images of, e.g., the letter "e." Often, the tagging of images (e.g., to train new models) is done by a human. This process is incredibly costly and time consuming.

SUMMARY

The disclosed embodiments provide electric vehicle charging stations (EVCSs) that include cameras. In various embodiments, the cameras are employed for a variety of tasks, such as targeting media content to drivers and passersby. For example, by performing demographic or sentiment analysis on people near the charging station, images from the camera can be used to target advertisements to such people.

These cameras are also ideally suited for obtaining and categorizing (e.g., labeling) images of electric vehicles (e.g., according to a characteristic, such as the make, model, and/or year of the electric vehicle). To that end, numerous embodiments are disclosed for automatically labeling images of an electric vehicle at an EVCS. For example, in some embodiments, the EVCSs described herein receive information about the electric vehicle through a charging cable when the electric vehicle is plugged into the EVCS. Alternatively, in some embodiments, the EVCSs describe herein include numerous sensors in addition to the camera, such as an infrared sensor, a magnetometer, a scale, and the like. Information from these sensors is used, in some embodiments, to determine the characteristic of the vehicle (e.g., by passing the information to a machine learning algorithm). Alternatively, in some embodiments, the characteristic of the vehicle is determined from a user's account when the user checks-in to initiate charging (e.g., on a mobile application).

Such labelled (also referred to as tagged) images are used, in some embodiments, for training machine learning models to categorize various aspects of electric vehicles (e.g., the make, model, and year of the electric vehicle). Such labelled images may also be used to sort and retrieve images according to the labeled characteristic (e.g., for any purpose for which numerous images of a certain make, model, and year of vehicle are needed).

Further, some embodiments of the present invention relate to selecting images from a continuous video stream to use for training a machine learning algorithm. Using all of the images from a continuous video stream, however, would place an excess burden on human taggers to sort through and tag the images. Human taggers would have to, for example, sort through the video to determine which images show an electric vehicle.

The disclosed embodiments solve this problem by selecting, from images captured by a camera at an EVCS, only those images that include an electric vehicle. The resulting subset of images is used to train a machine learning model to categorize electric vehicles (e.g., categorize the make, model, and/or year of the electric vehicle). In some embodiments, to determine which images include an electric vehicle, the disclosed embodiments make use of a change in the state (also referred to as a status) of the electric vehicle charging station. For example, the change in the state of the EVCS may correspond to an electric vehicle being electrically connected to the EVCS, or an operator of the electric vehicle "checking in" to the EVCS on their mobile phone. Images captured by the camera that correspond to the change of state are thus determined to be images of an electric vehicle. This allows the EVCS's camera to continuously perform other tasks (e.g., performing image recognition) while simultaneously obtaining data that can be used to train a machine learning model to recognize electric vehicles.

In some embodiments, prior to training the machine learning model, the subset of images (e.g., only the subset of images) is tagged. In some embodiments, the tagging is performed by a human. Rather than having to sort through an entire video feed, the human tagger only has to tag images that have already been identified (by a computer system, based on the change in state of an EVCS) as including an electric vehicle, thus improving the efficiency of the human tagging process. In other embodiments, information from the EVCS is used to tag (e.g., as metadata) the characteristics of the electric vehicle without human intervention. For example, information about the make, model, and year of the electric vehicle is provided through the charging cable and used to tag the images. In another example, the characteristics of the electric vehicle are stored in a profile of the user who checks-in to the electric vehicle charging station, and those characteristics are used to tag the images without human intervention, thus reducing or eliminating altogether the need for human taggers.

To that end, in accordance with some embodiments, a method is performed at a computer system that includes one or more processors and memory. The computer system is in communication with an electric vehicle charging station (EVCS) and the EVCS includes a camera for obtaining video of a region proximal to the EVCS. The method includes capturing (e.g., obtaining) video using the camera. The video includes a plurality of frames for a contiguous period of time. The method also includes monitoring a status of the EVCS. The status of the EVCS is indicative of whether the EVCS is in use. The method further includes detecting a change in the status of the EVCS, and in accordance with the detected change in the status of the EVCS, identifying a respective frame of the video as including an image of at least a portion of an electric vehicle. The method also includes training a machine learning algorithm to identify electric vehicles using a subset (e.g., less than all) of the plurality of frames for the contiguous period of time. The subset of frames includes the respective frame identified as including an image of at least a portion of an electric vehicle.

Some embodiments of the present disclosure provide a computer system (e.g., a server system), comprising one or more processors and memory storing one or more programs. The one or more programs store instructions that, when executed by the one or more processors, cause the computer system to perform any of the methods described herein.

Some embodiments of the present disclosure provide a non-transitory computer readable storage medium storing instructions that, when executed by a computer system having one or more processors, cause the computer system to perform any of the methods described herein.

Again, these systems and methods reduce or eliminate the conflict between, on the one hand, needing a large amount of data to train machine learning models and, on the other hand, the burden that conventional methods would place on human taggers to categorize such data. The embodiments described herein can be used to obtain data to train machine learning models, not just for recognizing that an electric vehicle per se, but for distinguishing between different years of the same make and model and/or recognizing the same make and model in different lighting conditions and weather (e.g., day versus night, sun versus snow).

BRIEF DESCRIPTION OF THE DRAWINGS

For a better understanding of the various described embodiments, reference should be made to the Detailed Description below, in conjunction with the following drawings in which like reference numerals refer to corresponding parts throughout the Figures.

FIG. 6A illustrates training a model to identify an electric vehicle in accordance with some embodiments.

FIGS. 10A-10C illustrate a flowchart of a method of labeling (e.g., tagging) images of electric vehicles that are captured at a charging station for an electric vehicle (e.g., EVCS 100), in accordance with some embodiments.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

Figure 1:
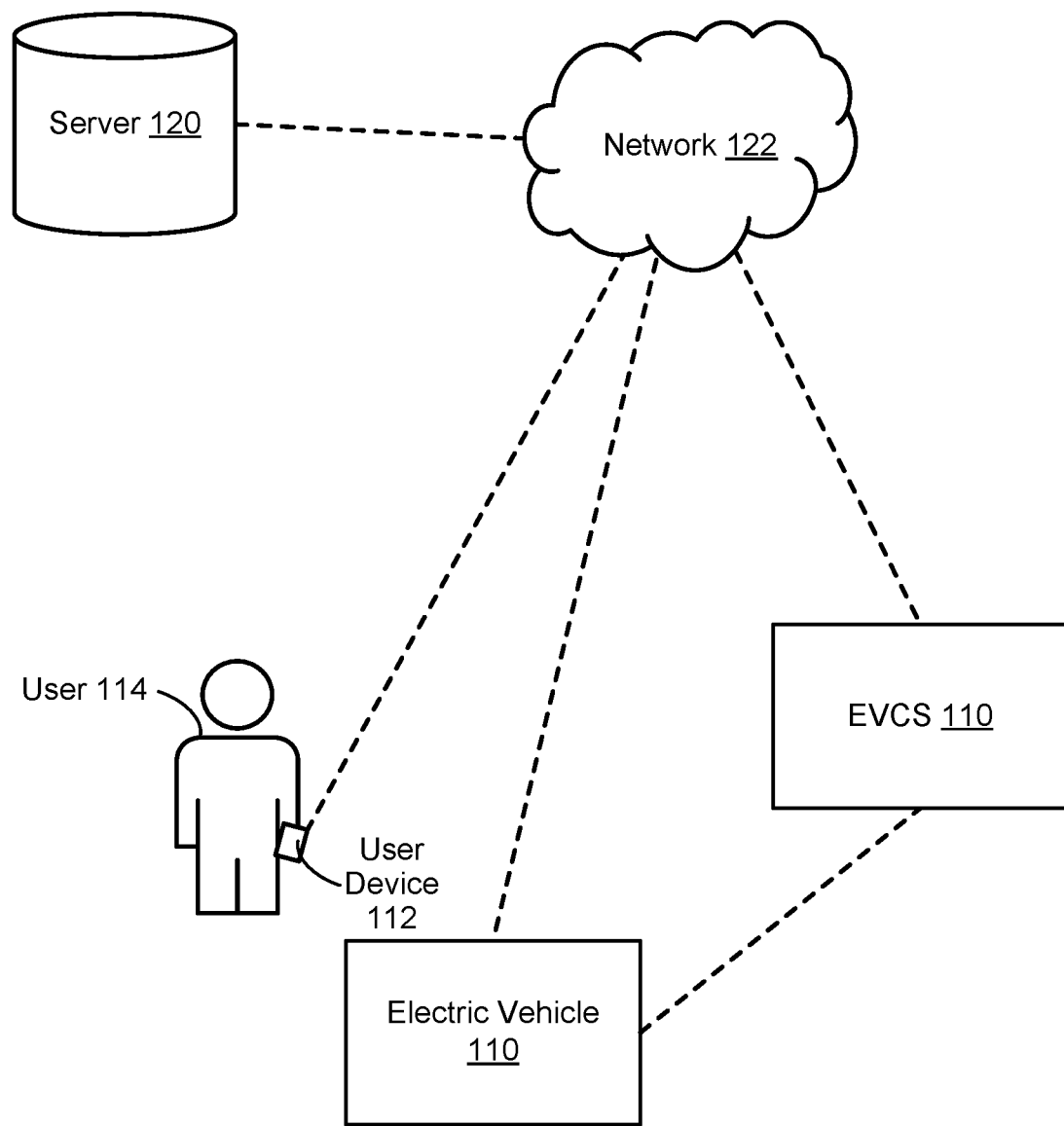
FIG. 1 illustrates a system for charging an electric vehicle in accordance with some embodiments.

FIG. 1 illustrates an electric vehicle charging station (EVCS) 100 that is configured to provide an electric charge to an electric vehicle 110 via one or more electrical connections. In some embodiments, the EVCS 100 provides an electric charge to electric vehicle 110 via a wired connection, such as a charging cable. Alternatively, the EVCS 100 may provide an electric charge to electric vehicle 110 via a wireless connection (e.g., wireless charging). In some embodiments, the EVCS may be in communication with the electric vehicle 110 or a user device 112 belonging to a user 114 (e.g., a driver, passenger, owner, renter, or other operator of the electric vehicle 110) that is associated with the electric vehicle 110. In some embodiments, the EVCS 100 communicates with one or more devices or computer systems, such as user device 112 or server 120, respectively, via a network 122.

In some embodiments, the EVCS 100 includes one or more sensors for determining a state of an area surrounding the EVCS 100. For example, the area includes one or more parking spaces, where an electric vehicle parks in order to use the EVCS 100. In some embodiments, the area includes walking paths (e.g., sidewalks) next to the EVCS 100. The sensors of the EVCS 100 include one or more of a camera, ultrasound sensor, depth sensor, IR/RGB camera, PIR, heat IR, radar, thermometer, a barometer, and a magnetometer.

In some embodiments, the EVCS 100 includes a display for displaying messages (e.g., media content) to users of the charging station (e.g., drivers) and/or to passersby that are in proximity to the EVCS 100.

Some embodiments of the present disclosure provide a computer system that includes one or more processors and memory, such as server 120.

Some embodiments of the present disclosure provide an EVCS 100 with one or more processors and memory storing instructions for performing a set of operations, including determining a state of the charging station, wherein the state indicates a status of an electric vehicle at the charging station.

Figure 2A:
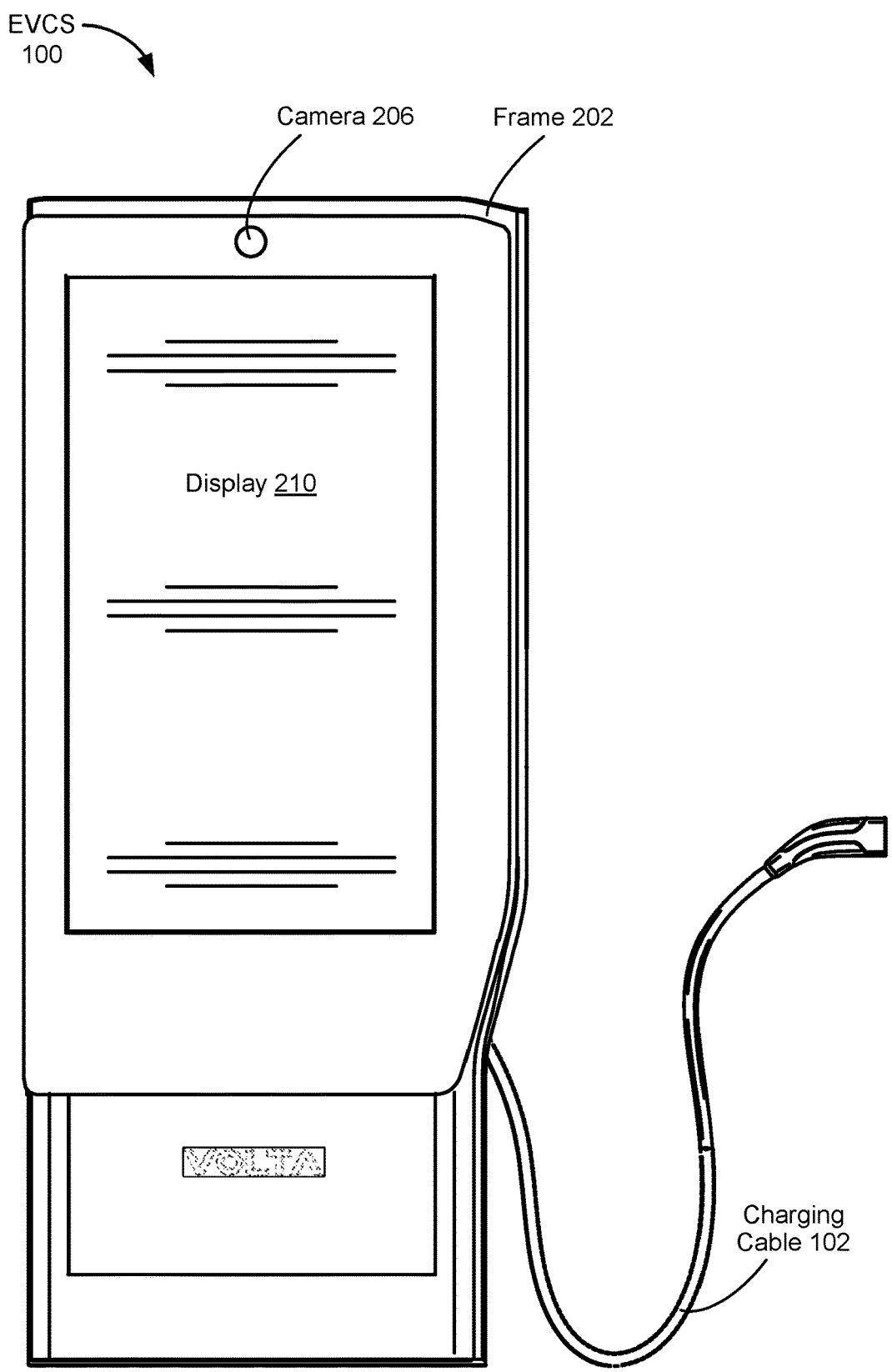
FIGS. 2A-2C illustrate a charging station for an electric vehicle in accordance with some embodiments.
Figure 2B:
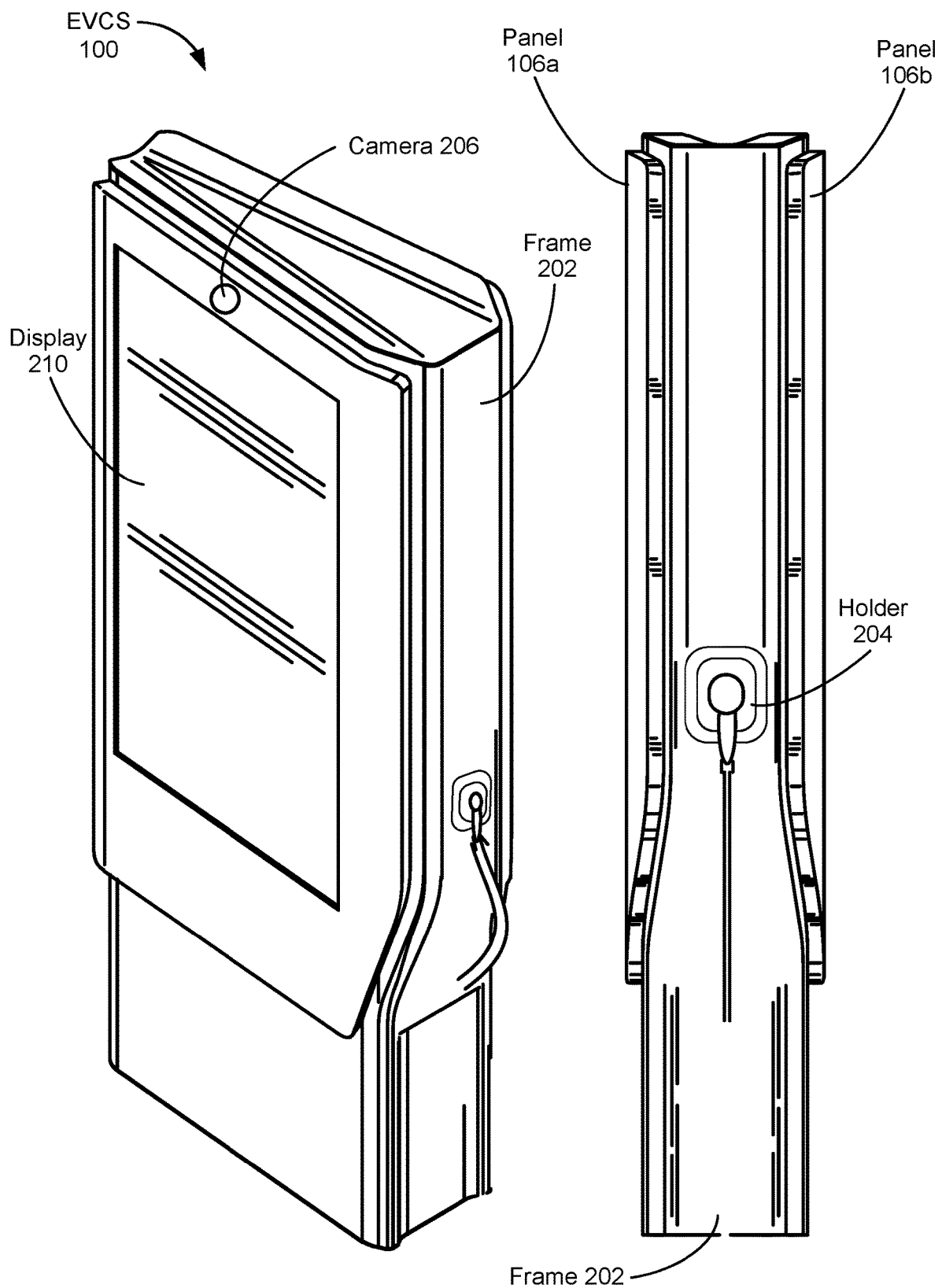
Figure 2C:
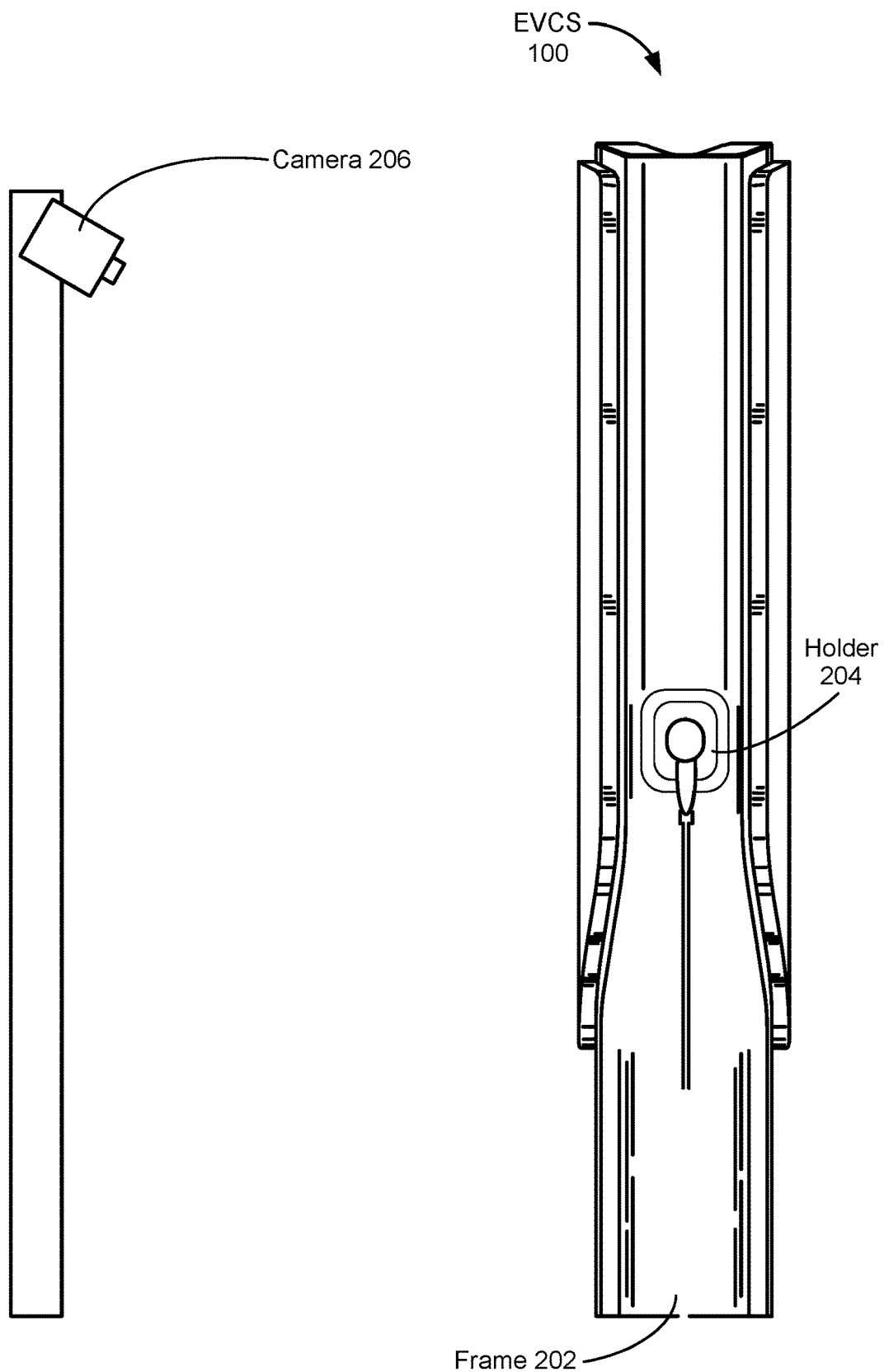

FIG. 2A is a mechanical drawing showing various views of an electric vehicle charging station (EVCS) 100, in accordance with some embodiments. FIG. 2B is a mechanical drawing showing additional views of the EVCS 100 of FIG. 2A, in accordance with some embodiments. FIG. 2C shows an alternative configuration of EVCS 100, in accordance with some embodiments. FIGS. 2A-2C are discussed together below.

EVCS 100 includes a frame 202 (e.g., a body or a chassis) including a charging cable 102 (e.g., connector) configured to connect and provide a charge to an electric vehicle. An example of a suitable connector is an IEC 62196 type-2 connector. In some embodiments, the connector is a "gun-type" connector (e.g., a charge gun) that, when not in use, sits in a holder 204 (e.g., a holster). In some embodiments, the frame 202 houses circuitry for charging an electric vehicle. For example, in some embodiments, the frame 202 includes power supply circuitry as well as circuitry for determining a state of a vehicle being charged (e.g., whether the vehicle is connected via the connector, whether the vehicle is charging, whether the vehicle is done charging, etc.).

The EVCS 100 further includes one or more displays 210 facing outwardly from a surface of the EVCS 100. For example, the EVCS 100 may include two displays 210, one on each side of the EVCS 100. Each display 210 faces outwardly from the EVCS 100. In some embodiments, the panel 106a (and/or panel 106b) has a height that is at least 60% of a height of the frame 202 and a width that is at least 90% of a width of the frame 202. In some embodiments, the panel 102 has a height that is at least 3 feet and a width that is at least 2 feet.

In some embodiments, the EVCS 100 includes one or more panels that hold a display 210. The displays are large compared to the frame 202 (e.g., 60% or more of the height of the frame and 80% or more of the width of the frame), allowing the displays 210 to function as billboards, capable of conveying information to passersby. In some embodiments, the displays 210 are incorporated into articulating panels that articulate away from the frame 202 (e.g., a sub-frame). The articulating panels solve the technical problem of the need for maintenance of the displays 210 (as well as one or more computers that control content displayed on the display). To that end, the articulating panels provide easy access to the entire back of the displays 210. In addition, in some embodiments, the remaining space between the articulating panels (e.g., within the frame 202) is hollow, allowing for ample airflow and cooling of the displays 210.

The EVCS 100 further includes a computer that includes one or more processors and memory. The memory stores instructions for displaying content on the display 210. In some embodiments, the computer is disposed inside the frame 202. In some embodiments, the computer is mounted on a panel that connects (e.g., mounts) a first display (e.g., a display 210) to the frame 202. In some embodiments, the computer includes a near-field communication (NFC) system that is configured to interact with a user's device (e.g., user device 112 of a user 114 of the EVCS 100).

In some embodiments, the frame 202 includes one or more lights configured to provide predetermined illumination patterns indicating a status of the EVCS 100. In some embodiments, at least one of the one or more lights is configured to illuminate an area proximal to the EVCS 100 as a person approaches the area (e.g., a driver returning to a vehicle or a passenger exiting a vehicle that is parked in a parking spot associated with the EVCS 100).

In some embodiments, the frame 202 includes one or more cameras 206 configured to capture one or more images of an area proximal to the EVCS 100. In some embodiments, the one or more cameras 206 are configured to obtain video of an area proximal to the EVCS 100. For example, a camera may be configured to obtain a video or capture images of an area corresponding to a parking spot associated with the EVCS 100. In another example, another camera may be configured to obtain a video or capture images of an area corresponding to a parking spot next to the parking spot of the EVCS 100. In a third example, the camera 206 may be a wide angle camera or a 360° camera that is configured to obtain a video or capture images of a large area surrounding the EVCS 100, including a parking spot of the EVCS 100. As shown in FIG. 2B, the one or more cameras 206 may be mounted directly on a frame 202 of the EVCS 100 and may have a physical (e.g., electrical, wired) connection to the EVCS 100 or a computer system associated with the EVCS 100. Alternatively, as shown in FIG. 2C, the one or more cameras 206 may be disposed separately from but proximal to the frame 202 of the EVCS 100. In such cases, the one or more cameras 206 may be connected to the EVCS 100 or a computer system associated with the EVCS 100 via wireless connections such as via a Wi-Fi connection or a Bluetooth connection. In some embodiments, the camera 206 may be positioned at different locations on the EVCS 100 than what is shown in the figures. Further, in some embodiments, the one or more cameras 206 include a plurality of cameras positioned at different locations on the EVCS 100.

Figure 3:
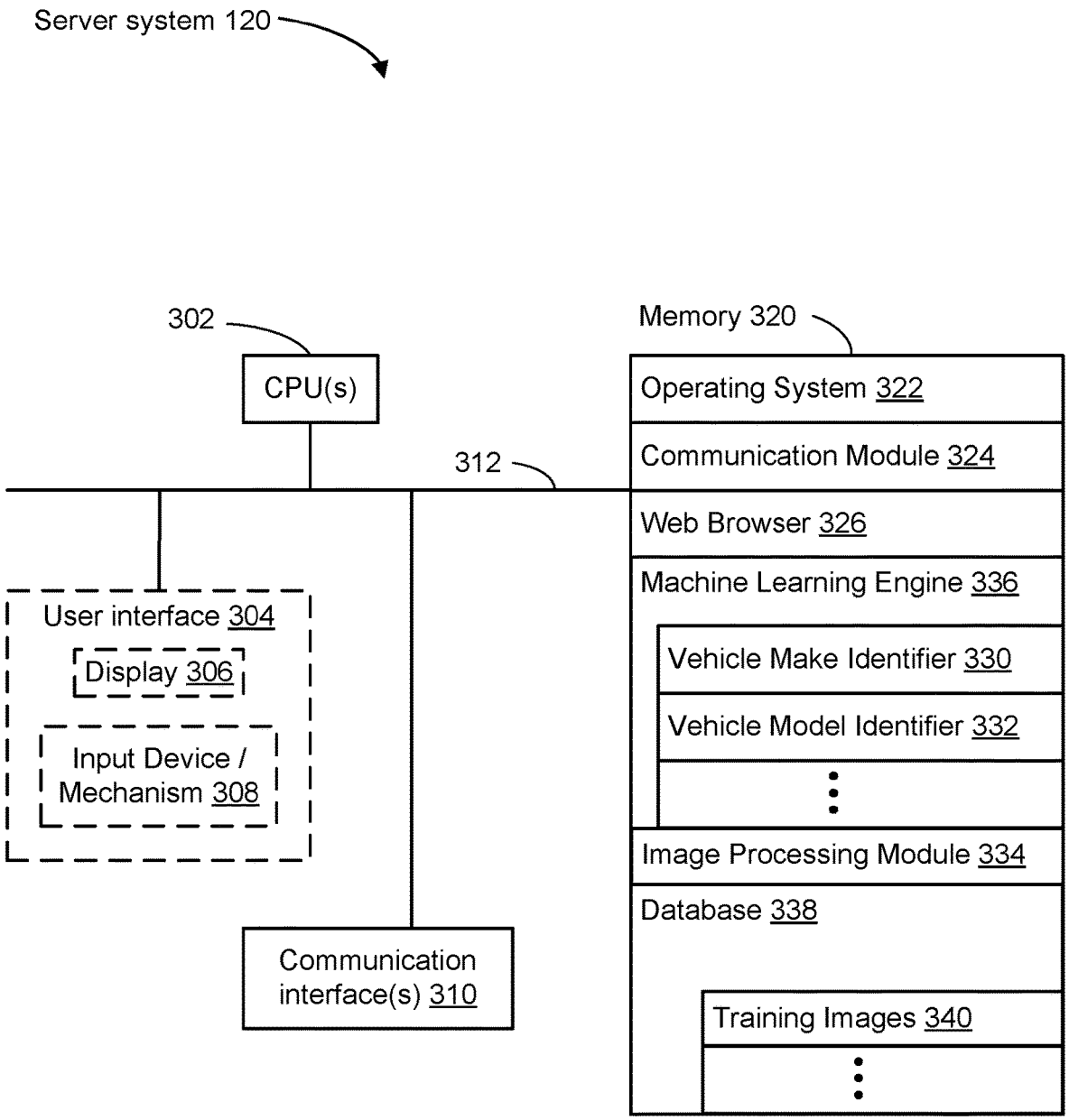
FIG. 3 is a block diagram of a server system in accordance with some embodiments.

FIG. 3 is a block diagram of a server system 120, in accordance with some embodiments. Server system 120 may include one or more computer systems (e.g., computing devices), such as a desktop computer, a laptop computer, and a tablet computer. In some embodiments, the server system 120 is a data server that hosts one or more databases (e.g., databases of images or videos), models, or modules or may provide various executable applications or modules. The server system 120 includes one or more processing units (processors or cores, CPU(s)) 302, one or more network or other communications network interfaces 310, memory 320, and one or more communication buses 312 for interconnecting these components. The communication buses 312 optionally include circuitry (sometimes called a chipset) that interconnects and controls communications between system components. The server system 120 typically includes a user interface 304. The user interface 304 may include a display device 306 (e.g., a screen or monitor). In some implementations, the server system 120 includes one or more input devices 308 such as a keyboard, mouse, and/or other input buttons. Alternatively or in addition, in some embodiments, the display device 306 includes a touch-sensitive surface, in which case the display device 306 is a touch-sensitive display.

The memory 320 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 320 includes one or more storage devices remotely located from the processors 302. The memory 320, or alternatively the non-volatile memory devices within the memory 320, includes a non-transitory computer-readable storage medium. In some implementations, the memory 320 or the computer-readable storage medium of the memory 320 stores the following programs, modules, and data structures, or a subset or superset thereof:

- an operating system 322, which includes procedures for handling various basic system services and for performing hardware dependent tasks;
- a communications module 324, which is used for connecting the server system 120 to other computers and devices via the one or more communication network interfaces 310 (wired or wireless), such as the Internet, other wide area networks, local area networks, metropolitan area networks, and so on;

a web browser 326;

machine learning engine 336 for processing images that include a vehicle and identifying one or more characteristics of the vehicle (e.g., identifying a make, model, year, and type of the vehicle, using a trained machine learning model such as a trained neural network). For example, machine learning engine 336 includes a vehicle make identifier 330 configured to determine a manufacturer (e.g., brand) of a vehicle, and a vehicle model identifier 332 configured to determine a model of a vehicle. The vehicle make identifier 330 and the vehicle model identifier 332 work in combination to identify or characterize a vehicle shown in an image;

an image processing module 334 for selecting images based on a status of the EVCS, tagging images with information regarding a vehicle that is depicted in an image, and in some cases, removing or censoring at least a portion of an image that includes information that can be used to identify an operator of the electric vehicle. In some embodiments, image processing module 334 may select images captured within a predetermined time period after the EVCS 100 begins charging an electric vehicle. In some embodiments, image processing module 334 may tag images that include images of vehicles and store them for use in training one or more machine learning models (e.g., store only images that include vehicles and forgo storing images that do not include vehicles). In some embodiments, these tagged images are used to train the machine learning engine 336 (e.g., after optional additional human tagging);

database 338 for storing received images. In some embodiments, the server system 120 receives one or more images captured at an EVCS and stores them in database 338, e.g., including training images 340 for training the machine learning engine 336. In some embodiments, the training images 340 include images that have been determined by image processing module 334 as depicting an electric vehicle.

In some implementations, the memory 320 may store thresholds and other criteria, which are compared against metrics and/or characteristics determined by the machine learning engine 336. For example, the machine learning engine 336 may determine (e.g., calculate) a confidence level or an accuracy score for each determined vehicle make and model. In another example, the machine learning engine 336 may be updated with feedback on the accuracy of its determinations and the machine learning engine 336 may compare a calculated confidence level with feedback regarding a previous determination that is stored in the memory 320 and adjust the confidence level accordingly.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 320 stores a subset of the modules and data structures identified above. Furthermore, the memory 320 may store additional modules or data structures not described above.

Although FIG. 3 shows a server system 120, FIG. 3 is intended more as a functional description of the various features that may be present rather than as a structural schematic of the implementations described herein. In practice, and as recognized by those of ordinary skill in the art, items shown separately could be combined and some items could be separated.

Figure 4:
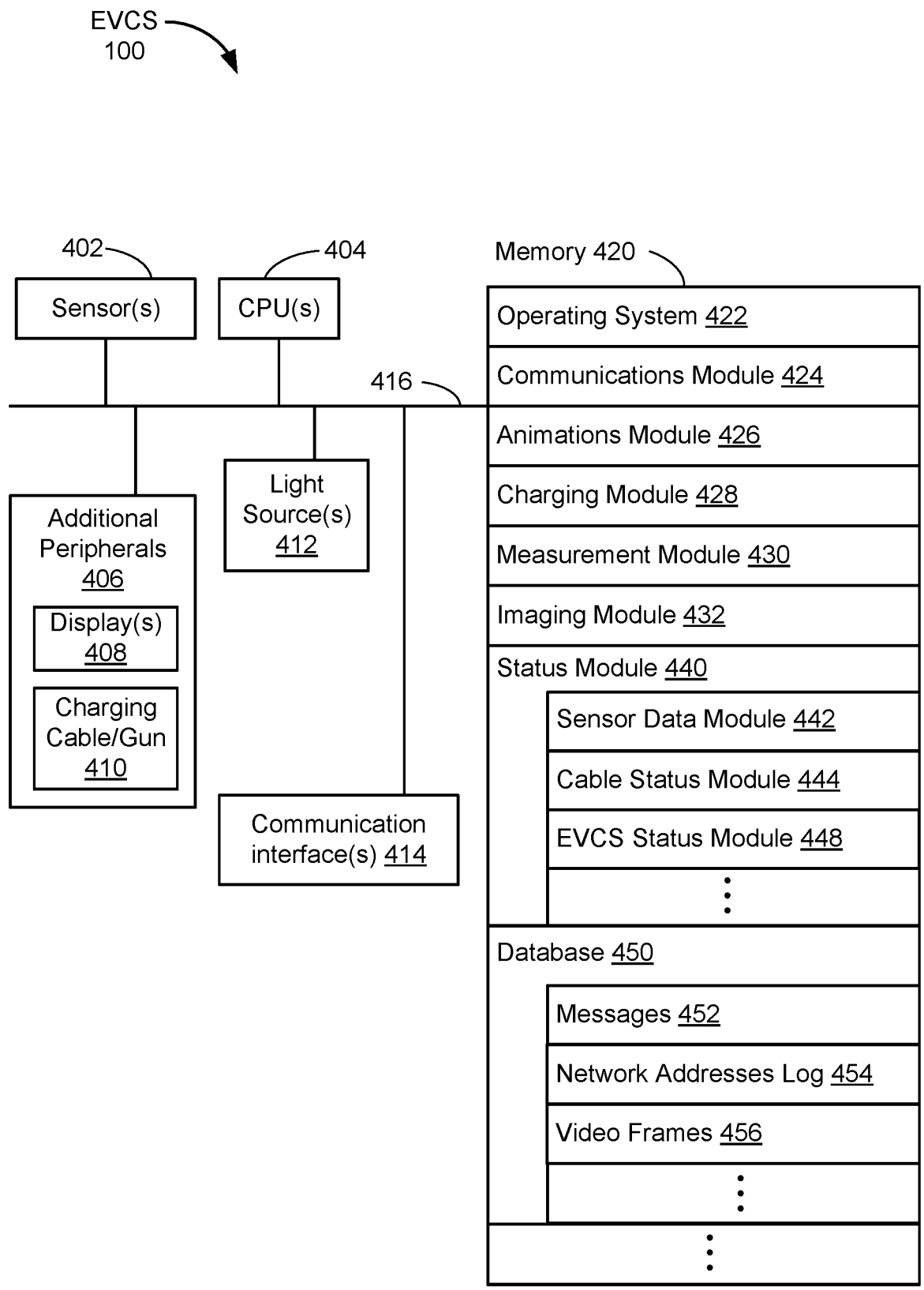
FIG. 4 is a block diagram of a charging station for an electric vehicle in accordance with some embodiments.

FIG. 4 is a block diagram of an EVCS 100 for charging an electric vehicle, in accordance with some embodiments. The EVCS 100 typically includes one or more processing units (processors or cores) 404, one or more network or other communications network interfaces 414, memory 420, one or more light sources 412, one or more sensors 402, additional peripherals 406, and one or more communication buses 416 for interconnecting these components. The communication buses 416 optionally include circuitry (sometimes called a chipset) that interconnects and controls communications between system components.

EVCS 100 typically includes additional peripherals 406 such as one or more displays (corresponding to displays 210 shown in FIGS. 2A and 2B) for displaying content, and a charging cable 410 (e.g., charging cable 102 shown in FIGS. 1, 2A, and 2B, also referred to as a charging gun) for connecting the EVCS 100 to an electric vehicle for charging the electric vehicle. In some embodiments, the display 408 may be a touch-sensitive display that is configured to detect various swipe gestures (e.g., continuous gestures in vertical and/or horizontal directions) and/or other gestures (e.g., a single or double tap) or to detect user input via a soft keyboard that is displayed when keyboard entry is needed.

The user interface may also include one or more sensors 402 such as cameras (e.g., camera 206, described above with respect to FIGS. 2A and 2B), ultrasound sensors, depth sensors, infrared cameras, visible (e.g., RGB or black and white) cameras, passive infrared sensors, heat detectors, infrared sensors, or radar. In some embodiments, the one or more sensors 402 may also be used to detect one or more user gestures and provide user input to the EVCS 100 in order to perform a function, such as updating display content or initiating charging an electric vehicle.

The memory 420 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 420 includes one or more storage devices remotely located from the processors 404, such as database 338 of server system 120 that is in communication with the EVCS 100. The memory 420, or alternatively the non-volatile memory devices within the memory 420, includes a non-transitory computer-readable storage medium. In some implementations, the memory 420 or the computer-readable storage medium of the memory 420 stores the following programs, modules, and data structures, or a subset or superset thereof:

an operating system 422, which includes procedures for handling various basic system services and for performing hardware dependent tasks;

a communications module 424, which is used for connecting the EVCS 100 to other computers and devices via the one or more communication network interfaces 414 (wired or wireless), such as the Internet, other wide area networks, local area networks, metropolitan area networks, and so on;

an animations module 426 for animating the one or more light sources 412 to provide predetermined illumination patterns or to provide illumination for passersby and users of the EVCS 100;

a charging module 428 for charging an electric vehicle (e.g., measuring how much charge has been delivered to an electric vehicle, commencing charging, ceasing charging, etc.);

a measurement module 430 for providing one or more measurements obtained by the one or more sensors 402;

imaging module 432 for providing one or more images or frames of a video captured by one or more cameras (e.g., cameras 206) of the one or more sensors 402;

a status module 440 for monitoring a status of the EVCS 100. The status module includes sensor data module 442 that provides a status of the one or more sensors 402 (e.g., indicating that the first camera is non-operational) and/or determines a status based on information provided by the one or more sensors 402 (e.g., the temperature is 70° F.), a cable status module 444 that provides a status of the charging gun or charging cable 102 (e.g., the charging cable 102 requires repair), and an EVCS status module 448 that provides a status of the EVCS 100 (e.g., EVCS 100 is not currently in use and is available); and database 450 for storing information received or obtained at EVCS 100, such as one or more messages 452 (e.g., messages to/from a user device 112 or an electric vehicle 110, error messages recorded by the status module 440, etc.), network addresses log 454 (e.g., network addresses of user devices 112 that established a communication or connection with EVCS 100), and video frames 456 captured by the one or more sensors 402 (e.g., images or video frames obtained by camera 206).

In some implementations, the memory 420 stores metrics, thresholds, and other criteria, which are compared against the measurements captured by the one or more sensors 402. For example, the one or more sensors 402 may measure an internal temperature of computing systems in the frame 202 of EVCS 100 and the measured internal temperature is compared to one or more threshold temperatures (e.g., a threshold high temperature and a threshold low temperature) to determine whether or not the EVCS 100 is operating at an optimal temperature or with in an acceptable temperature range. In another example, measured internal temperature may be used to provide feedback to a cooling system installed in the EVCS 100.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 420 stores a subset of the modules and data structures identified above. Furthermore, the memory 420 may store additional modules or data structures not described above.

Although FIG. 4 shows an EVCS 100, FIG. 4 is intended more as a functional description of the various features that may be present rather than as a structural schematic of the implementations described herein. In practice, and as recognized by those of ordinary skill in the art, items shown separately could be combined and some items could be separated. For example, the database 450 may be stored in a first memory and the status modules 440 may be stored in a second memory that is separate from the first memory.

Figure 5:
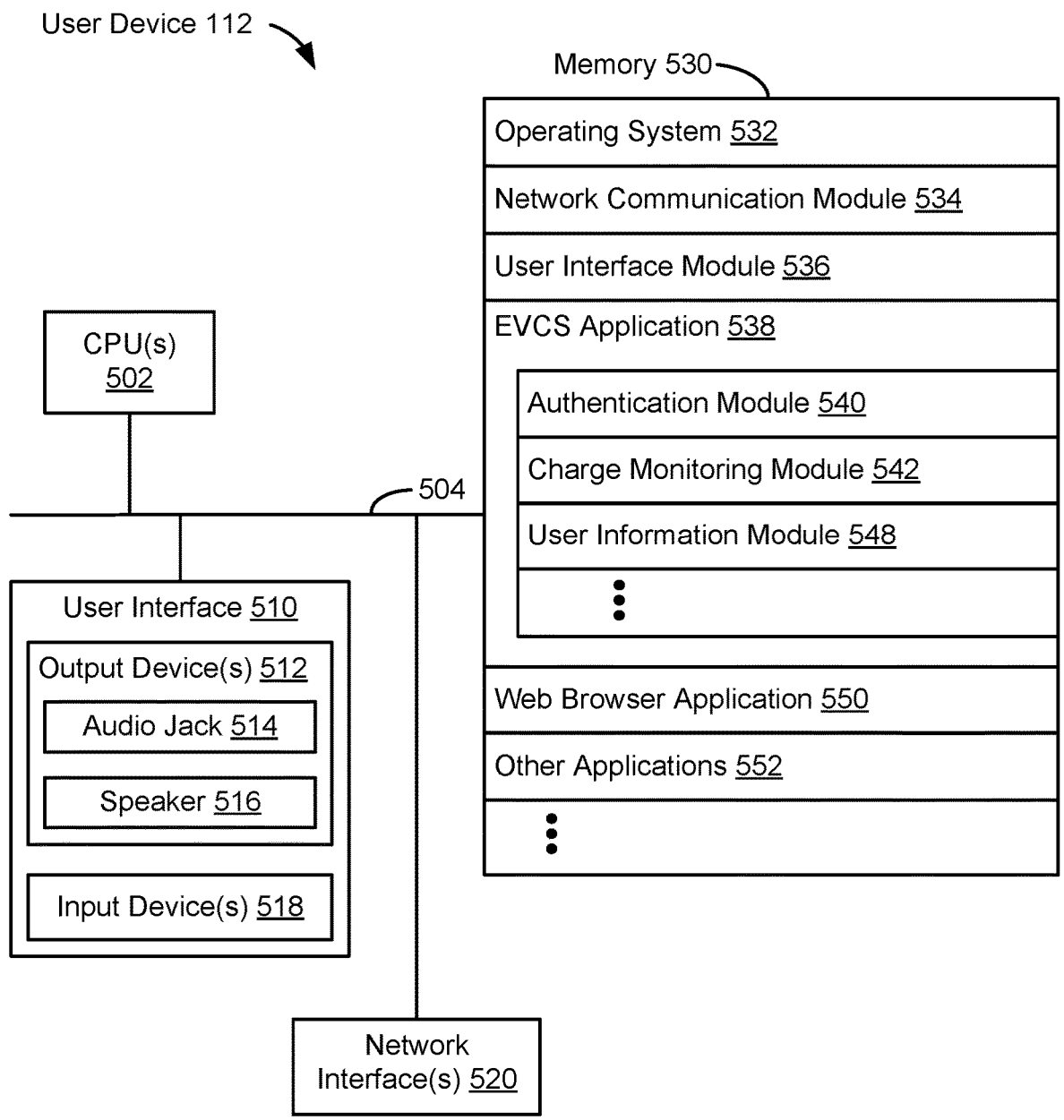
FIG. 5 is a block diagram of a user device in accordance with some embodiments.

FIG. 5 is a block diagram of a user device 112 of a user 114 in accordance with some embodiments. In some embodiments, the user 114 is associated with an electric vehicle 110 at EVCS 100. Various examples of the computing device 112 include a cellular-capable smart device such as a smartphone, a smart watch, a laptop computer, a tablet computer, and other computing devices that have a processor capable of connecting to the EVCS 100 via a communications network (e.g., network 122).

The user device 112 typically includes one or more processing units (processors or cores) 502, one or more network or other communications network interfaces 520, memory 530, and one or more communication buses 504 for interconnecting these components. The communication buses 504 optionally include circuitry (sometimes called a chipset) that interconnects and controls communications between system components. The user device 112 typically includes a user interface 510. The user interface 510 typically includes a display (e.g., a screen or monitor). In some implementations, the user device 112 includes input devices 518 such as a keyboard, mouse, and/or other input buttons. Alternatively or in addition, in some implementations, the user device 112 includes a touch-sensitive surface, in which case the display is a touch-sensitive display. In some implementations, the touch-sensitive surface is configured to detect various swipe gestures (e.g., continuous gestures in vertical and/or horizontal directions) and/or other gestures (e.g., single/double tap). In computing devices that have a touch-sensitive surface (e.g., a touch-sensitive display), a physical keyboard is optional (e.g., a soft keyboard may be displayed when keyboard entry is needed). Furthermore, user device 112 may also include a microphone and voice recognition software to supplement or replace the keyboard. The user interface 510 also includes one or more output devices 512 such as an audio output device 514, such as speakers 516 or an audio output connection 514 (e.g., audio jack) for connecting to speakers, earphones, or headphones.

The memory 530 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 530 includes one or more storage devices remotely located from the processors 502. The memory 530, or alternatively the non-volatile memory devices within the memory 530, includes a non-transitory computer-readable storage medium. In some implementations, the memory 530 or the computer-readable storage medium of the memory 530 stores the following programs, modules, and data structures, or a subset or superset thereof:

an operating system 532, which includes procedures for handling various basic system services and for performing hardware dependent tasks;

a network communication module 534, which is used for connecting the user device 112 to other computers and devices via the one or more communication network interfaces 520 (wired or wireless), such as the Internet, other wide area networks, local area networks, metropolitan area networks, and so on;

user interface module 536 for providing user interfaces for the user to interact with the user device 112 via applications on the user device 112 and the operating system 532 of the user device 112;

EVCS application 538 for communicating with an EVCS 100 or a server system that supports the EVCS 100. The EVCS application 538 includes authentication module 540 for authenticating the user device 112, so that the user device 112 can access (e.g., log into) a user profile (e.g., user account) on the EVCS application 538, a charge monitoring module 542 for providing updates on a charge status of an electric vehicle 110 that is associated with the user profile and using (e.g., plugged into, being charged by, parked at) EVCS 100 (e.g., status updates such as "Your vehicle is 70% charged", "Your vehicle has completed charging", "Your vehicle is fully charged", "Your free-charge time is up in 15 minutes"), and a user information module 548 that allows a user to create, delete, or update their profile (e.g., a user may update a profile to include a make and model of their vehicle);

a web browser application 550 for accessing the internet and accessing websites on the internet, including providing functionalities on the EVCS application 538 via a website accessed through web browser application 550; and other applications 552 that the user 114 may have installed on the user device 112 or that may have been included as default applications on the user device 112.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 530 stores a subset of the modules and data structures identified above. Furthermore, the memory 530 may store additional modules or data structures not described above.

Although FIG. 5 shows a user device 112, FIG. 5 is intended more as a functional description of the various features that may be present rather than as a structural schematic of the implementations described herein. In practice, and as recognized by those of ordinary skill in the art, items shown separately could be combined and some items could be separated.

Figure 10A:
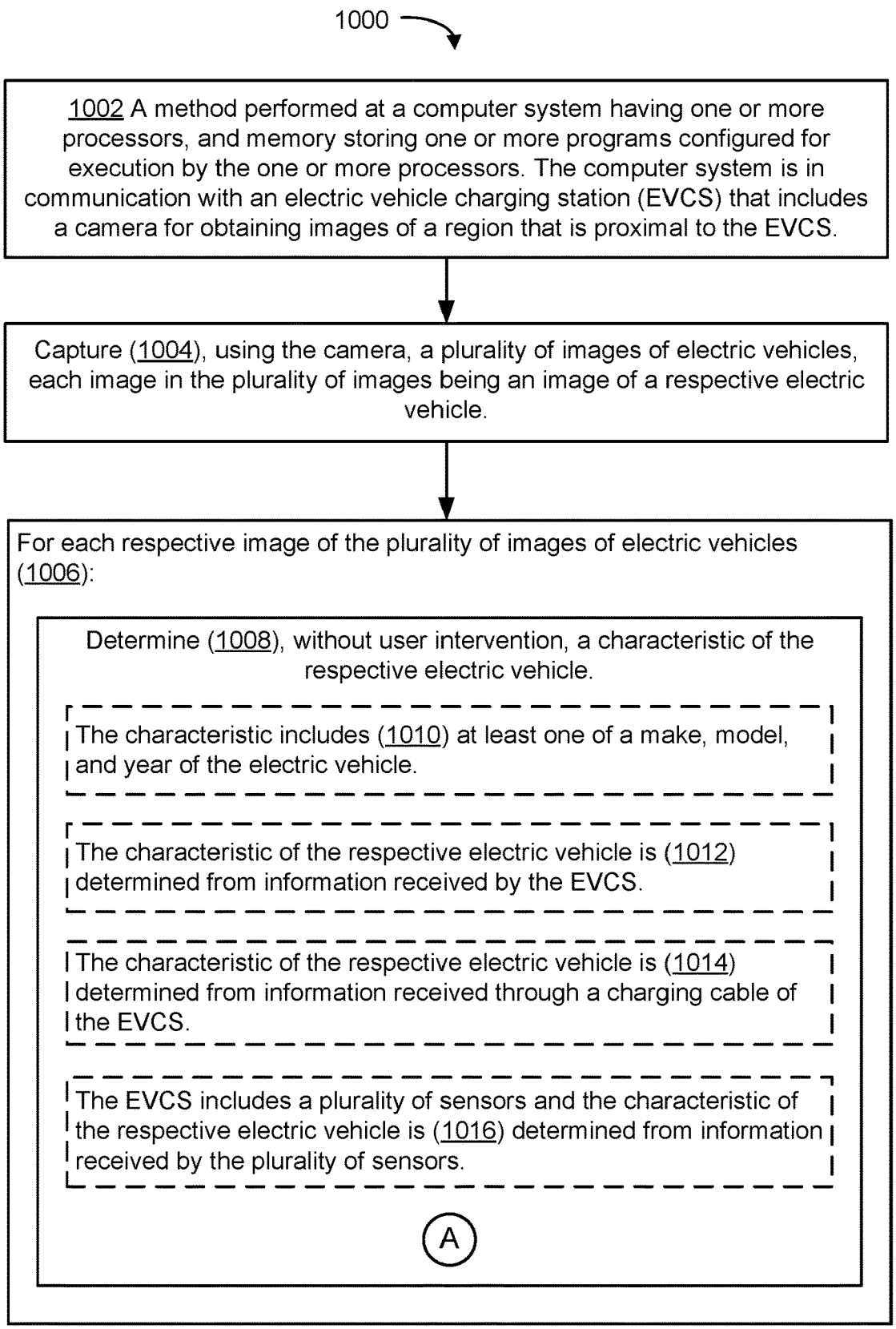
Figure 10C:
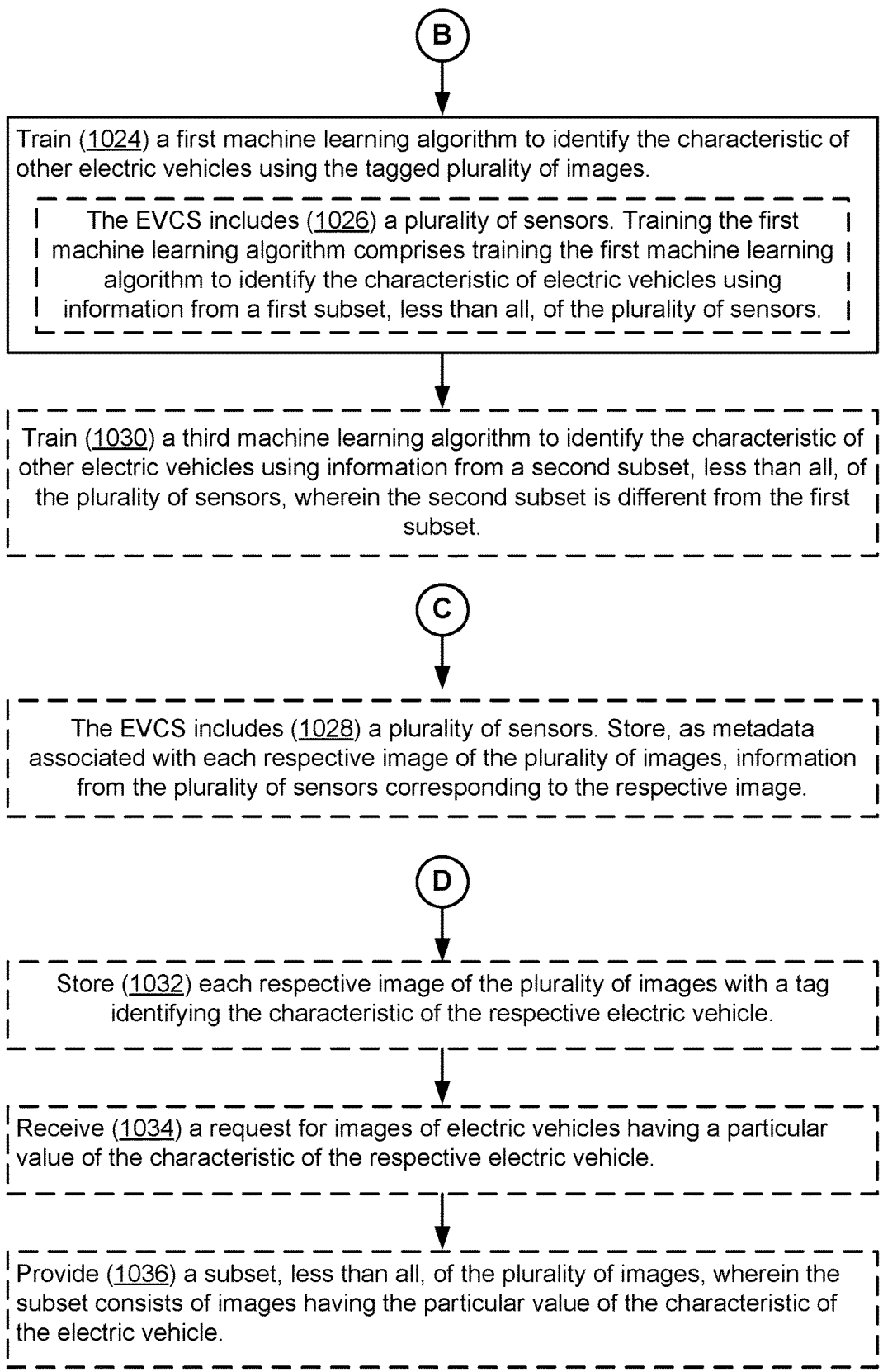

FIG. 6A illustrates training a model to identify an electric vehicle in accordance with some embodiments. In order to train the model (e.g., machine learning model or machine learning algorithm), the machine learning engine 336 receives a plurality of training images 340 that each include an image of an electric vehicle. In some embodiments, the images are automatically tagged (e.g., labelled) according to a make, model, and/or year of the electric vehicle as described in method 1000 (FIGS. 10A-10C). In some embodiments, as shown, a subset of video frames 456 that are captured by a camera 206 at an EVCS 100 and are determined to include an image of an electric vehicle are selected to be included in (e.g., to form) the training images 340. Video frames 456 include frames that include an image of a non-electric vehicle (e.g., a gas-powered vehicle) that are not included in the images selected to form the training images 340.

For example, a plurality of video frames 456 is captured by a camera 206 at an EVCS 100. The plurality of video frames 456 includes frames that show at least one vehicle (such as an electric vehicle parked at the EVCS) and frames that do not include an electric vehicle (e.g., frames obtained when the space is empty or has gas-powered vehicle parked therein). A subset of the plurality of video frames 456 that includes an electric vehicle (e.g., has an image of an electric vehicle) is selected to be used as training images 340 for training the machine learning engine 336. In this example, frames 456-1 and 456-2 have not been determined to include an image of an electric vehicle and thus, are not selected for use as training images 340. In contrast, video frames 456-3 and 456-$m$ have been determined to include an image of an electric vehicle and thus, are selected to be used as training images 340 for training the machine learning engine 336.

In order to determine which frames of the video frames 456 include an image of an electric vehicle and which frames do not include an image of an electric vehicle, a status of the EVCS 100 that obtains the video (e.g., obtains the video frames 456 via a camera 206) is monitored (e.g., by status module 440) and the determination of whether respective video frames include an image of a vehicle is based on a predefined detected change in the status of the EVCS 100 (e.g., a change to a predefined status, such as the EVCS being plugged in). For example, a detected change in status of the EVCS 100 can include any of the following:

disconnecting an electrical connection between an electric vehicle and the EVCS 100 (e.g., unplugging the electric vehicle, disconnecting the charging cable 102 from the electric vehicle);

initiating charging of an electric vehicle;

receiving input from a user of the EVCS 100 (e.g., receiving a user check-in via a user device 112 or at an input device 518 of EVCS 100);

receiving an indication that an electronic device of a user is located within a predetermined distance from the EVCS 100 (e.g., establishing a connection or communication with a user device 112 that is nearby);

establishing a connection (e.g., wireless connection, via cellular data, Wi-Fi, Bluetooth, etc.) between an electronic device (e.g., user device 112) of a user and the EVCS 100. In some embodiments, detecting a change in the status of EVCS 100 also includes determining that the user device 112 has the EVCS application 538 or that the user device 112 is associated with a user profile of an EVCS platform that supports the EVCS 100 (e.g., a company that owns the EVCS 100 or a server system that hosts network functions of the EVCS 100); and establishing a connection between the EVCS 100 and an electric vehicle (e.g., through an IEC 62196 type-2 connector, or a wireless connection with a computer on the EVCS). In some embodiments, detecting a change in the status of EVCS 100 also includes determining that the electric vehicle is associated with a user profile of an EVCS platform that supports the EVCS 100 (e.g., a company that owns the EVCS 100 or a server system that hosts network functions of the EVCS 100) or that the electric vehicle is registered with the EVCS platform.

A subset of the video frames 456 are selected to be used as training images 340 based on a change in status of the EVCS 100. The selected frames include an image of an electric vehicle.

For example, when status module 440 detects that a status of EVCS 100 has been changed due to a user action to begin charging an electric vehicle (e.g., electric vehicle 110), image processing module 334 may identify frames of a video that are captured (e.g., obtained) at the EVCS 100 within a predetermined time period (e.g., within the next 1 minute, 2 hours) after the start of charging the electric vehicle as including an image of a vehicle (e.g., an image of the electric vehicle that is being charged). Thus, the identified frames are included in training images 340.

In another example, when status module 440 detects that a status of EVCS 100 has been changed due to a user action to cease charging an electric vehicle (e.g., electric vehicle 110), image processing module 334 may identify frames of a video that are captured at the EVCS 100 within a predetermined time period (e.g., within the next 1 minute, 2 hours) before the end of charging the electric vehicle as including an image of a vehicle (e.g., an image of the electric vehicle that is being charged). Thus, at least one of the identified frames is included in training images 340. In some embodiments, the image processing module 334 may determine that frames obtained after ceasing charging or after a vehicle pulls out of the parking spot are not included as training images 340. In some embodiments, image processing module 334 may determine that frames captured after a predetermined period of time after charging ceases are not included as training images 340. For example, the image processing module 334 may determine that frames captured more than 15 seconds after charging stops are not used as training images 340.

In a third example, when status module 440 detects that a status of EVCS 100 has been changed at a first time due to a user action to start charging an electric vehicle (e.g., electric vehicle 110) and changed at a second time due to user action to cease charging the electric vehicle, image processing module 334 may identify frames of a video that are obtained at the EVCS 100 between the first time and the second time as including an image of a vehicle (e.g., an image of the electric vehicle that is being charged). Thus, the identified frames are included in training images 340. In some embodiments, an electric vehicle may be parked at the EVCS 100 (e.g., at a parking spot corresponding to the EVCS 100) for a long period of time (e.g., multiple hours such as 4 hours, 6 hours, 12 hours) and thus, it may be desirable to include multiple images of the same vehicle over time as training images 340. For instance, over a 3 hour period, EVCS 100 may be able to obtain images (e.g., video frames) of the electric vehicle under different weather conditions, such as under overcast conditions before a rainstorm, during rainy conditions, and under sunny conditions after rain. Over an even longer period of time, such as 6 hours, EVCS 100 may be able to obtain images (e.g., video frames) of the electric vehicle under different lighting conditions, such as late afternoon conditions around 4:40 pm as well as low-light or night-time conditions are 10 pm.

In some embodiments, only a subset of images of the electric vehicle are included in training images 340. For example, because an EV may be parked at an EV case for several hours, it is not necessary to use every image of the EV captured by the camera. Instead, images at periodic intervals (e.g., once an hour, or once every two hours) may be included in the training images 340 to capture images of the same electric vehicle with different lighting conditions and weather. Other images captured by the camera during a continuous period of time that the state of the EVCS remains unchanged are not included in the training images 340. This way, the camera can continue to perform its other duties, while capturing appropriate images to train a machine learning model to recognize the EV in a variety of conditions.

In some embodiments, the sensors 402 of EVCS 100 may also obtain a sequence of measurements corresponding to an environmental status of the EVCS. In some embodiments, the environmental status of the EVCS may be obtained from a weather service based on a geographic location of the EVCS. The image processing module 334 may be triggered to identify a video frame for inclusion in the training images 340 when a difference between two measurements in the sequence of measurements meets a threshold condition (e.g., change in temperature by 5° F. over 1 hour period of time, change in brightness over 5 hours, change in humidity or pressure over 6 hours). For example, in some embodiments, a first temperature measurement at or around the time of a detected change in the status of EVCS 100 (e.g., begin charge) is compared to a second temperature measurement in order to determine whether or not the temperature (e.g., an environmental condition) around the EVCS 100 has changed. In response to the difference in temperature being above a specified threshold (e.g., change in temperature by 10° F. between start charging time and current time), the image processing module 334 may identify a frame obtained around the time of the second temperature measurement for inclusion as a training image 340.

In some embodiments, in response to the status module 440 determining that the status of the EVCS 100 remains unchanged over a predetermined period of time (e.g., 3 hours), the image processing module 334 may be triggered to identify a video frame for inclusion in the training images 340. For example, if an electric vehicle has been plugged into the EVCS 100 for 4 hours, a video frame obtained at or near the 4 hour mark is selected to be used as a training image 340 as lighting conditions are likely to have changed since the start of charging (for example, foggy morning conditions to bright and sunny mid-day conditions).

By including images of vehicles under different weather and lighting conditions as training images 340 for training machine learning algorithm 336, the machine learning algorithm 336 can be developed as a robust tool for identifying the make, model, and/or year of vehicles under a variety of environmental conditions. In some embodiments, weather or astronomical data may also be used in training the machine learning algorithm 336, thereby allowing the machine learning algorithm 336 to be aware of lighting conditions.

Once the training images 340 have been selected, each of the training images are tagged, either via image processing module 334 or a manual tagging process with the make, model, and/or year of the vehicle shown in the training image. In a manual tagging process, a human operator views a training image 340 and tags the image by inputting information regarding a make, model, and/or year of a vehicle shown in the image. In some embodiments, information from the EVCS is used to tag the characteristics of the electric vehicle in the training image. For example, information about the make, model, and year of the electric vehicle is provided through the charging cable and used to tag the images. In another example, the characteristics of the electric vehicle are stored in a profile of the user who checks in to the electric vehicle charging station, and those characteristics are used to tag the images, thus reducing or eliminating altogether the need for human taggers.

In some embodiments, image processing module 334 may also censor or remove (e.g., redact) at least a portion of a training image that includes information that can be used to identify an operator of the electric vehicle. For example, image processing module 334 may blur out faces of passengers or an operator.

After being tagged, the training images 340 (with tags) are used to train machine learning engine 336 to identify the make, model, and/or year of a vehicle based on an image of the vehicle.

Figure 6B:
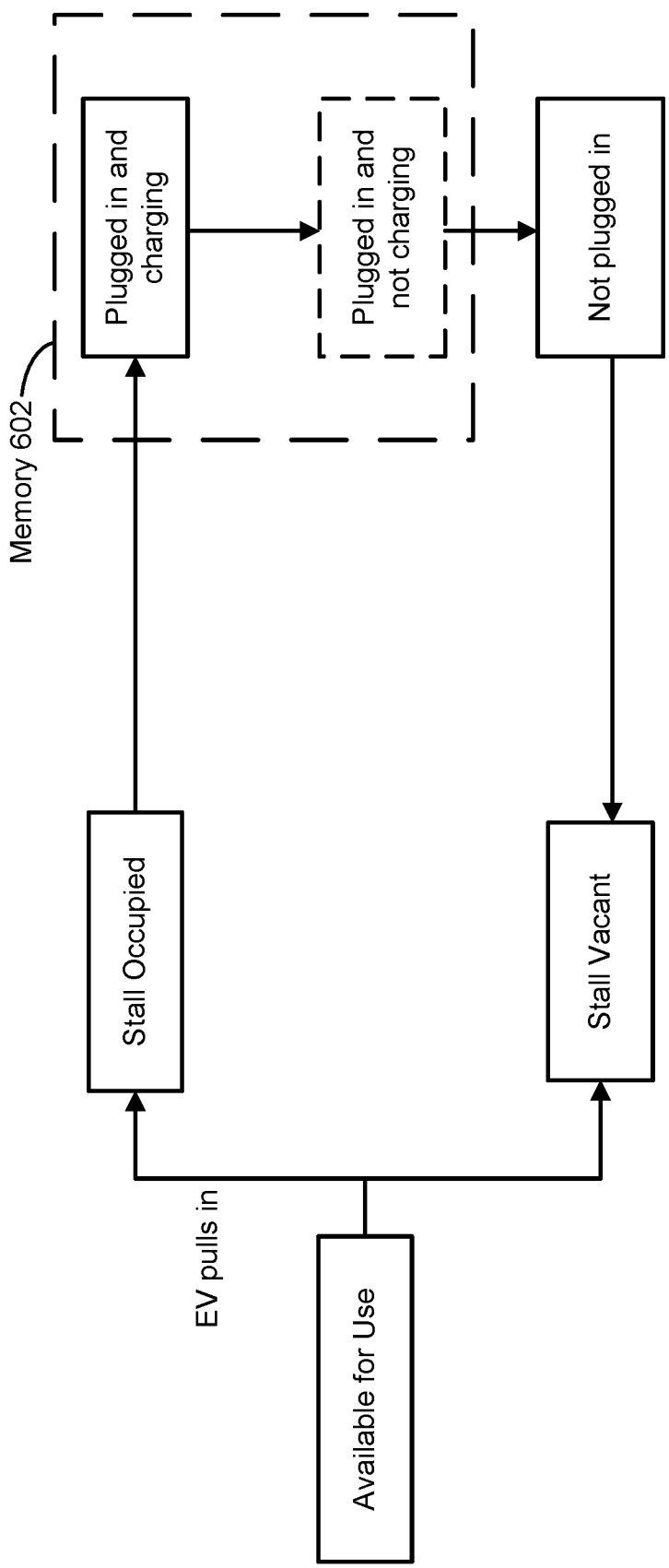
FIG. 6B illustrates statuses of a charging station for an electric vehicle in accordance with some embodiments.

FIG. 6B illustrates statuses of an EVCS 100 in accordance with some embodiments. When the EVCS 100 is operational (e.g., not broken, under repair, or undergoing maintenance), EVCS 100 is considered available when the parking spot (e.g., stall) associated with the EVCS 100 is empty and the EVCS 100 is not currently charging a vehicle. When an electric vehicle pulls into the stall, the stall becomes occupied even though the EVCS 100 is not yet in use (e.g., not charging the electric vehicle). Once the electric vehicle is connected to the EVCS 100, the EVCS is considered to be in use, including when the EVCS 100 is providing charge to the electric vehicle as well as when the electric vehicle is plugged into the EVCS 100 but is not charging the electric vehicle (e.g., charging is complete and electric vehicle has a substantially full battery (e.g., within a predefined threshold of 100%) but the operator has not returned to unplug and move the electric vehicle). The dashed box 602 shown in FIG. 6B refer to statuses of the EVCS 100 that indicate that the EVCS is in use. Once the operator (e.g., driver) has returned and disconnects (e.g., unplugs) the electric vehicle from EVCS 100, the EVCS 100 is no longer considered in use. However, at this point, EVCS 100 is still unavailable until the electric vehicle leaves the stall. When the stall is once again vacant, the EVCS has a status that indicates that it is available for use. Transitions between any of these statuses correspond to a change in the status of EVCS 100 and may be detected by status module 440. In some embodiments, EVCS 100 includes one or more sensors 402 that can detect whether the stall is occupied independently of an electric vehicle being connected to the EVCS 100. In some embodiments, the status of the EVCS 100 is determined independently (e.g., separately) from whether or not the stall is occupied.

Figure 6C:
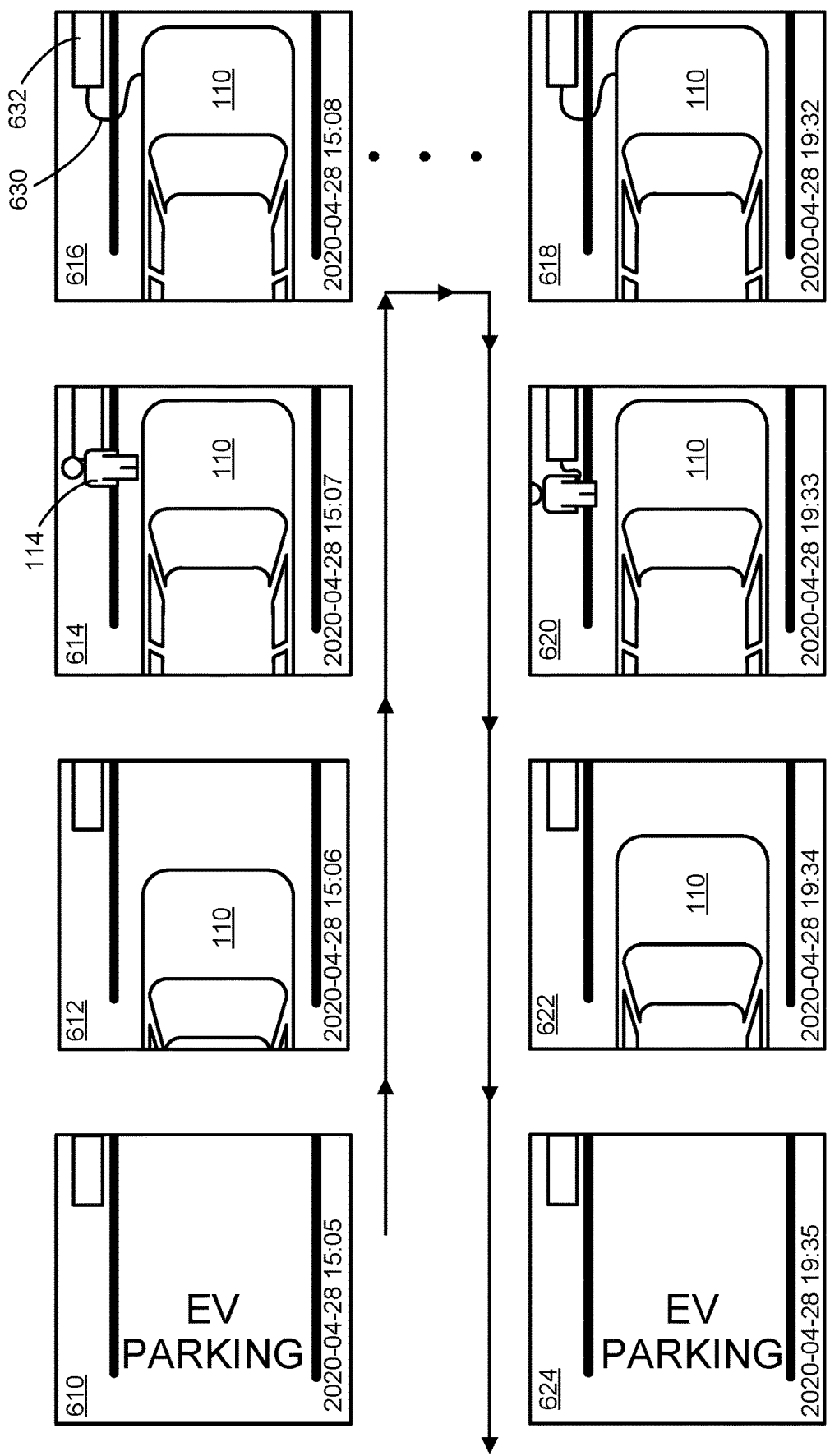
FIG. 6C illustrates frames from video captured at a charging station for an electric vehicle in accordance with some embodiments.

FIG. 6C illustrates frames from video captured at an EVCS in accordance with some embodiments. The frames 610 to 624 are obtained at an EVCS 632 (corresponding to EVCS 100) and show an area proximal to the EVCS 632, including a parking spot (e.g., stall) associated with the EVCS 632. Frame 610 shows an empty stall and that EVCS 632 is not currently in use. Frame 612 shows an electric vehicle 110 pulling into the stall. Frame 614 shows a user 114 interacting with the EVCS 632. In some embodiments, the user 114 may connect to the EVCS 632 remotely via a user device (e.g., user device 112 shown in FIG. 1). In some embodiments, the user may interact with the EVCS 632 through one or more interfaces of the EVCS 632, such as through a touch screen display, an input keypad, or by removing a charging gun from a charging holster on EVCS 632. Frame 616 shows that a charging cable 630 of EVCS 632 is connected to the electric vehicle 110 and the electric vehicle 110 is being charged by the EVCS 632. Frame 618 shows the electric vehicle 110 still being charged by the EVCS 632. The timestamps of frame 616 and 618 show that many hours have passed between the two frames. Although not shown for ease of illustration, EVCS 632 may capture one or more frames or may continue to obtain video between frames 616 and 618. Frame 620 shows that the user 114 has returned to her electric vehicle 110 and is interacting with the EVCS 632, in this case, by removing the charging cable 630 from the electric vehicle and thereby stopping charging of the electric vehicle 110. Frame 622 shows that electric vehicle 110 is pulling out of the stall, and frame 624 shows an empty stall and that the EVCS 632 is not currently in use.

Frames 610 to 624 are examples of video frames 456 that are obtained at an EVCS (in this case, EVCS 632). A subset of the frames 610 to 624 include an image of a vehicle (in this case, electric vehicle 110) and thus, may be used as training images 340 to train a machine learning engine 336.

For example, a change in the status of EVCS 632 may be detected sometime around frame 614 and frame 616 (e.g., around 15:07 and 15:08 according to timestamps of frames 614 and 616). The change in status may indicate that charging of the electric vehicle 110 has begun. In some embodiments, frames subsequent to the detected status change (including frames 616, 618, and 620, as well as any frames between frames 616 and 618 that are not shown) may be identified as showing an electric vehicle and therefore may be used as training images 340. In some embodiments, another change in the status of EVCS 632 may be detected sometime around frame 620 (e.g., around 19:33 according to the timestamp of frame 620). The change in status may indicate that charging of the electric vehicle 110 has ceased or that the user 114 is interacting with EVCS 632. In some embodiments, frames that are captured prior to the second status change (including frames 616, 618, and 620, as well as any frames between frames 616 and 618 that are not shown) may be identified as showing an electric vehicle and therefore may be used as training images 340.

In some embodiments, frames that are captured between a first status change (e.g., the electric vehicle being plugged in) and a second status change (e.g., the electric vehicle being unplugged) are tagged with, or grouped to be tagged with, the same metadata identifying features of the vehicle. Thus, in some circumstances, there is no need to separately tag different images captured between the first status change and the second status change, since such images show the same vehicle.

Although frames 610 to 624 are shown as being captured from above (e.g., bird's eye view), it should be understood that frames 610 and 624 are examples of video frames captured by an EVCS (e.g., EVCS 632, EVCS 100). Thus, video frames 456 may include frames captured from different angles or distances. To that end, additional examples of video frames 456 are shown with respect to FIGS. 8A to 8F. Additionally, video frames (e.g., any of video frames 456 and video frames 610 to 624) are obtained at a camera 206 that is part of the EVCS. In some embodiments, as shown in FIG. 1, the camera 206 is mounted directly on the frame 202 of the EVCS. In some embodiments, the camera 206 may be disposed separately from a frame of the EVCS but still be connected to and considered as part of the EVCS system. For example, the camera 206 of an EVCS system may be mounted on a post so that the EVCS is also included in the video frames.

Figure 7A:
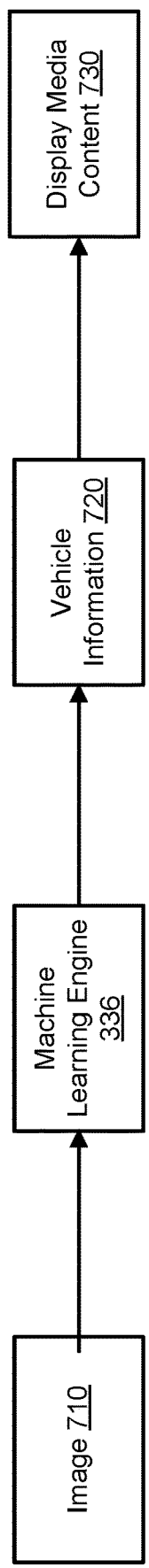
FIG. 7A illustrates using a trained model to identify an electric vehicle in accordance with some embodiments.

FIG. 7A illustrates using a trained machine learning engine 336 to identify an electric vehicle in accordance with some embodiments. When an electric vehicle 110 pulls up to an EVCS 100, the EVCS captures an image 710 of the electric vehicle 110. The image 710 may be a video frame from a video captured by a camera 206 on EVCS 100. The image 710 of the electric vehicle 110 is sent to machine learning engine 336. Machine learning engine 336, which is trained to identify a make, model, and/or year of a vehicle, receives the image 710 that shows electric vehicle 110. Machine learning engine 336 outputs vehicle information 720, which includes information regarding the vehicle 110, including any of a make, model, and year of the vehicle 110. The EVCS 100 then displays one or more media content items 730 on a display 210 of the EVCS 100. The vehicle information 720 is used to determine what media content items to provide (e.g., a media item is selected in accordance with the vehicle information). For example, when an electric vehicle that is determined to be an older model (more than 3 years old) pulls up to EVCS 100, EVCS 100 may display one or more advertisements for a newer model of a similar or similarly priced vehicle. In another example, when a vehicle pulls up to the EVCS 100, the vehicle may be identified as being a compact car that is produced by a first manufacturer. The EVCS 100 may display an advertisement for a compact car that is produced by a different manufacturer that competes for a similar market (e.g., target audience) as the identified vehicle.

Figure 7B:
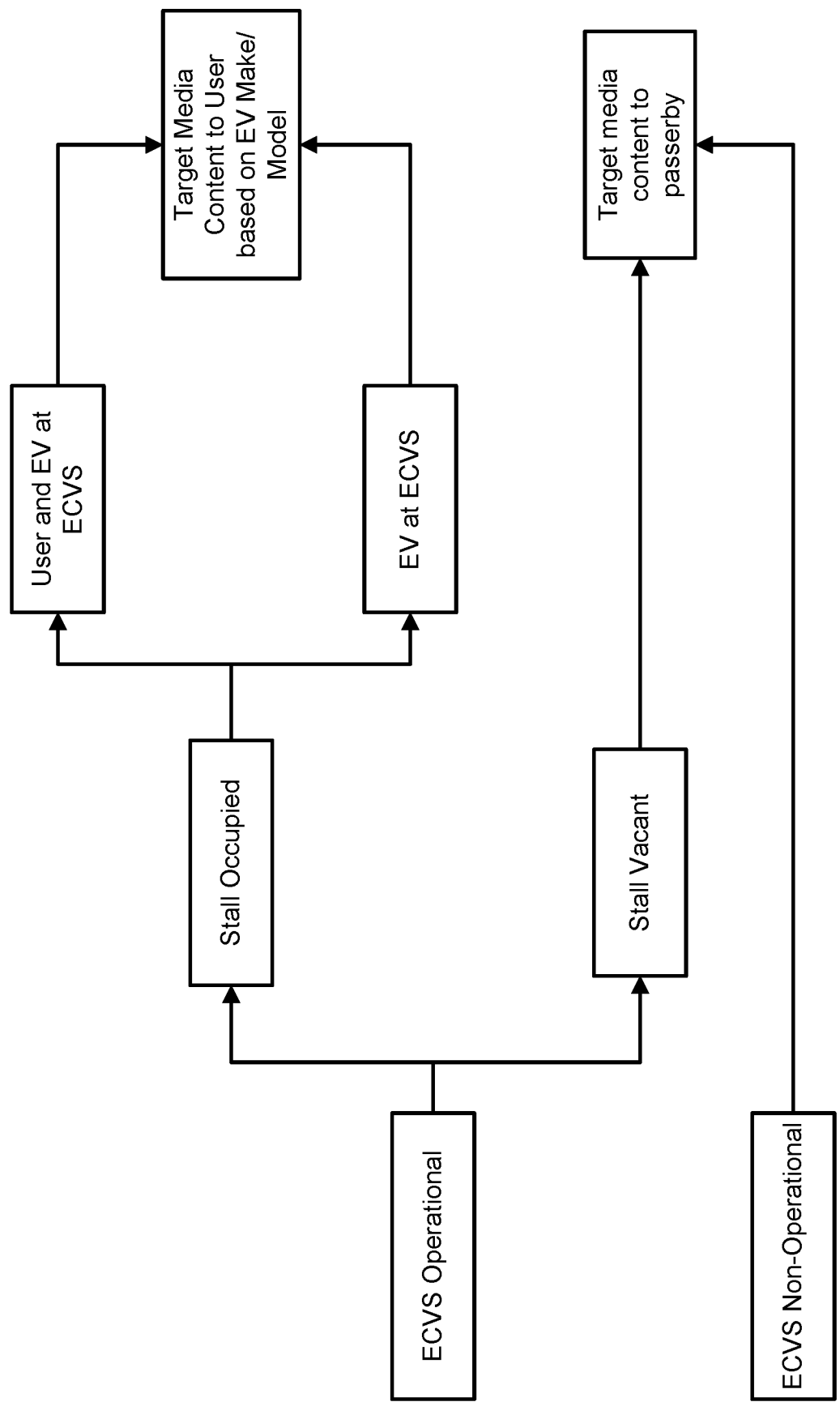
FIG. 7B illustrates displaying targeted media content at a charging station for an electric vehicle in accordance with some embodiments.

FIG. 7B illustrates displaying a targeted media content item at an EVCS 100 in accordance with some embodiments. For example, when the EVCS 100 is operational (e.g., in working condition, during operational hours), the EVCS 100 can provide media content items in general, or can provide media content items that are targeted towards either a user of the EVCS 100 or to passersby. Alternatively, when the EVCS 100 is non-operational (e.g., out of service or during non-operational hours), the EVCS 100 may display one or more media content items that are targeted to passersby that are in the vicinity of the EVCS 100. Alternatively, the EVCS 100 may display one or more media content items in general, for example, when no passersby are detected or determined to be in the vicinity of the EVCS 100.

The EVCS 100 may display one or more media content items based on a make, model, and/or year of the electric vehicle. Note that, in some embodiments, the same camera that is used to capture images for training machine learning models to recognize electric vehicles (as described elsewhere in this document) is also used to perform image recognition in order to target media content items. When the stall associated with the EVCS 100 is not occupied, the EVCS 100 may display one or more media content items that are targeted to passersby that are in the vicinity of the EVCS 100. Alternatively, the EVCS 100 may display one or more media content items in general, for example, when no passersby are detected or determined to be in the vicinity of the EVCS 100.

Figure 8A:
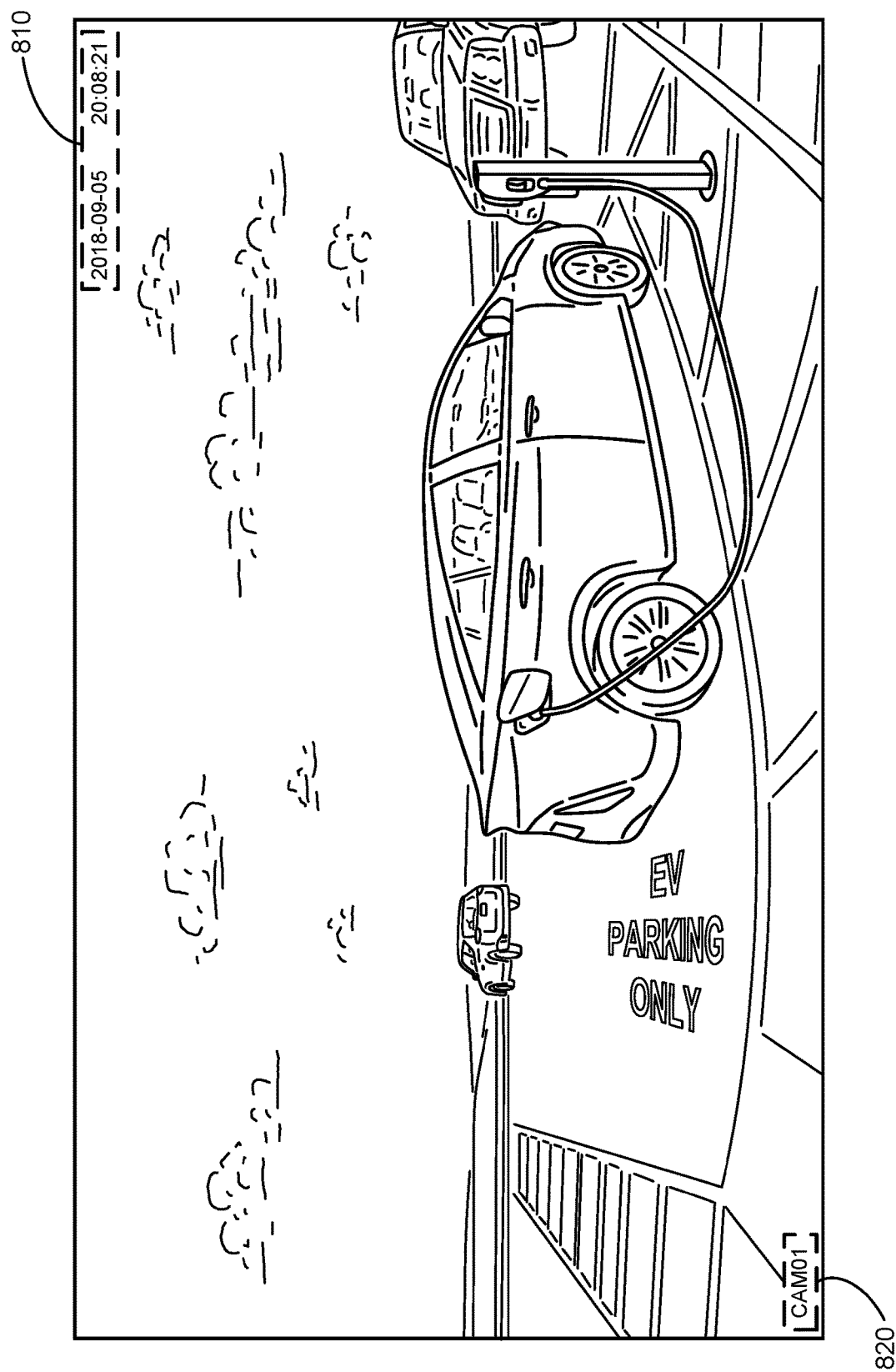
FIGS. 8A-8F illustrate examples of frames captured at an electric vehicle charging station, in accordance with some embodiments.
Figure 8B:
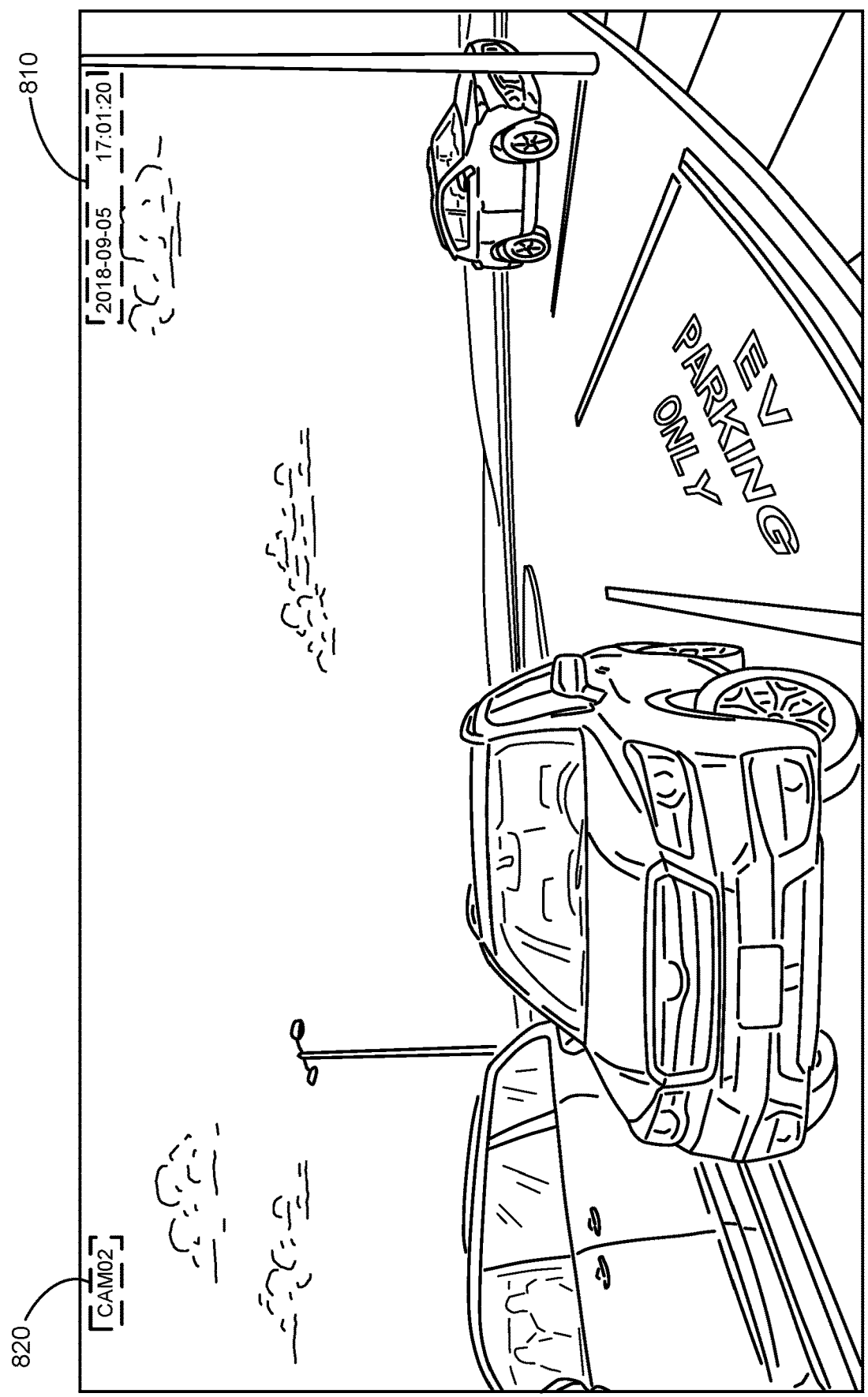
Figure 8C:
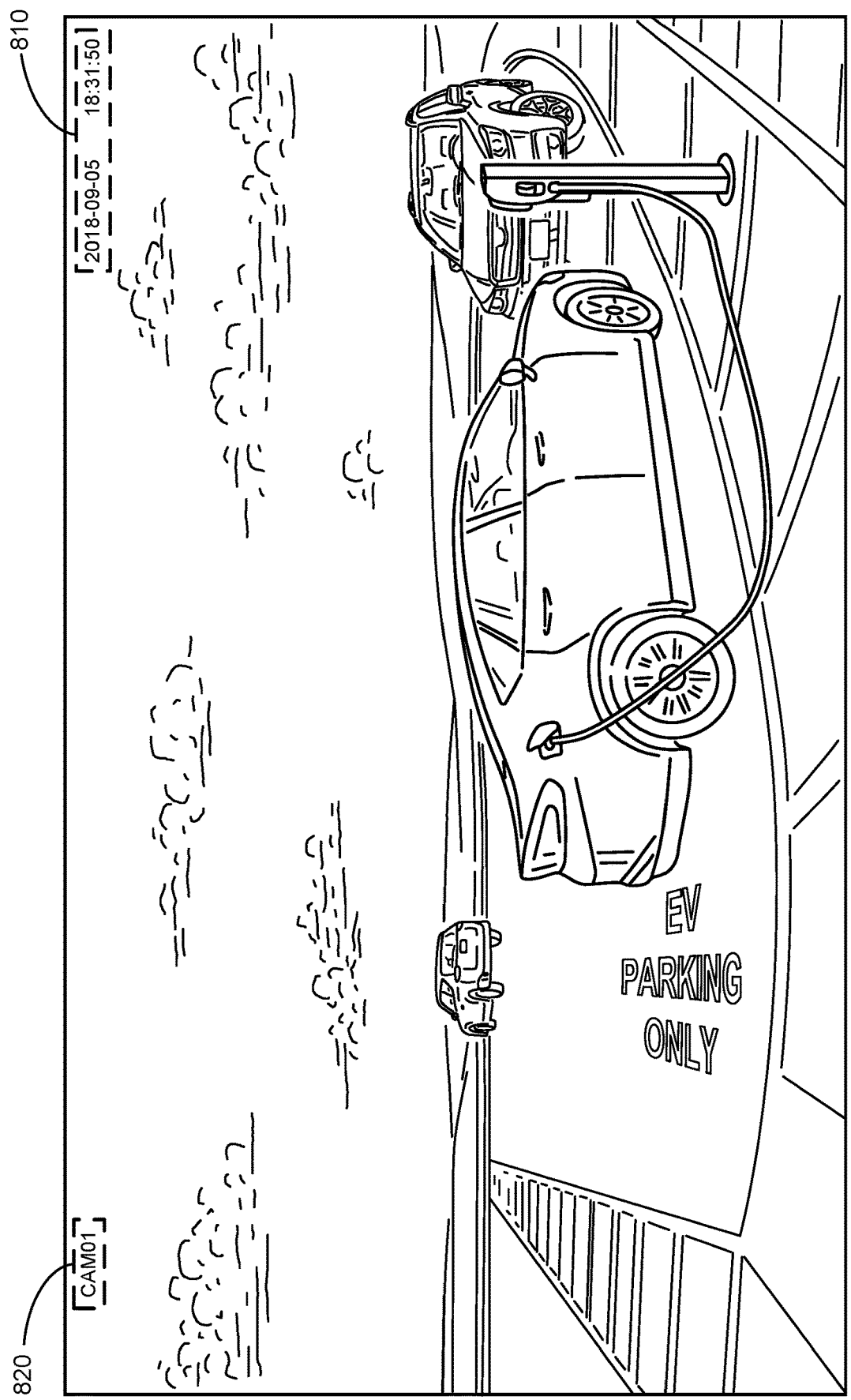
Figure 8D:
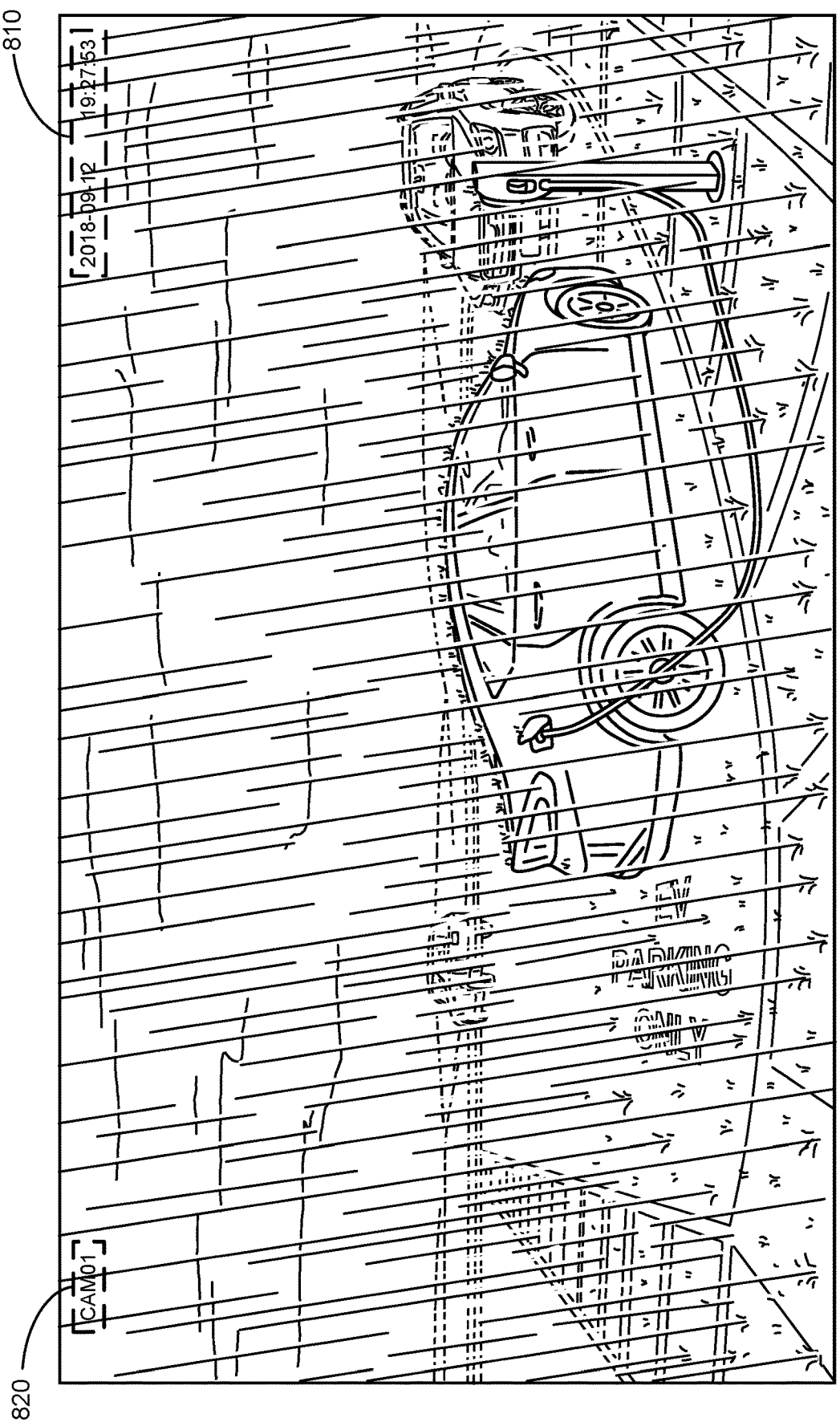
Figure 8E:
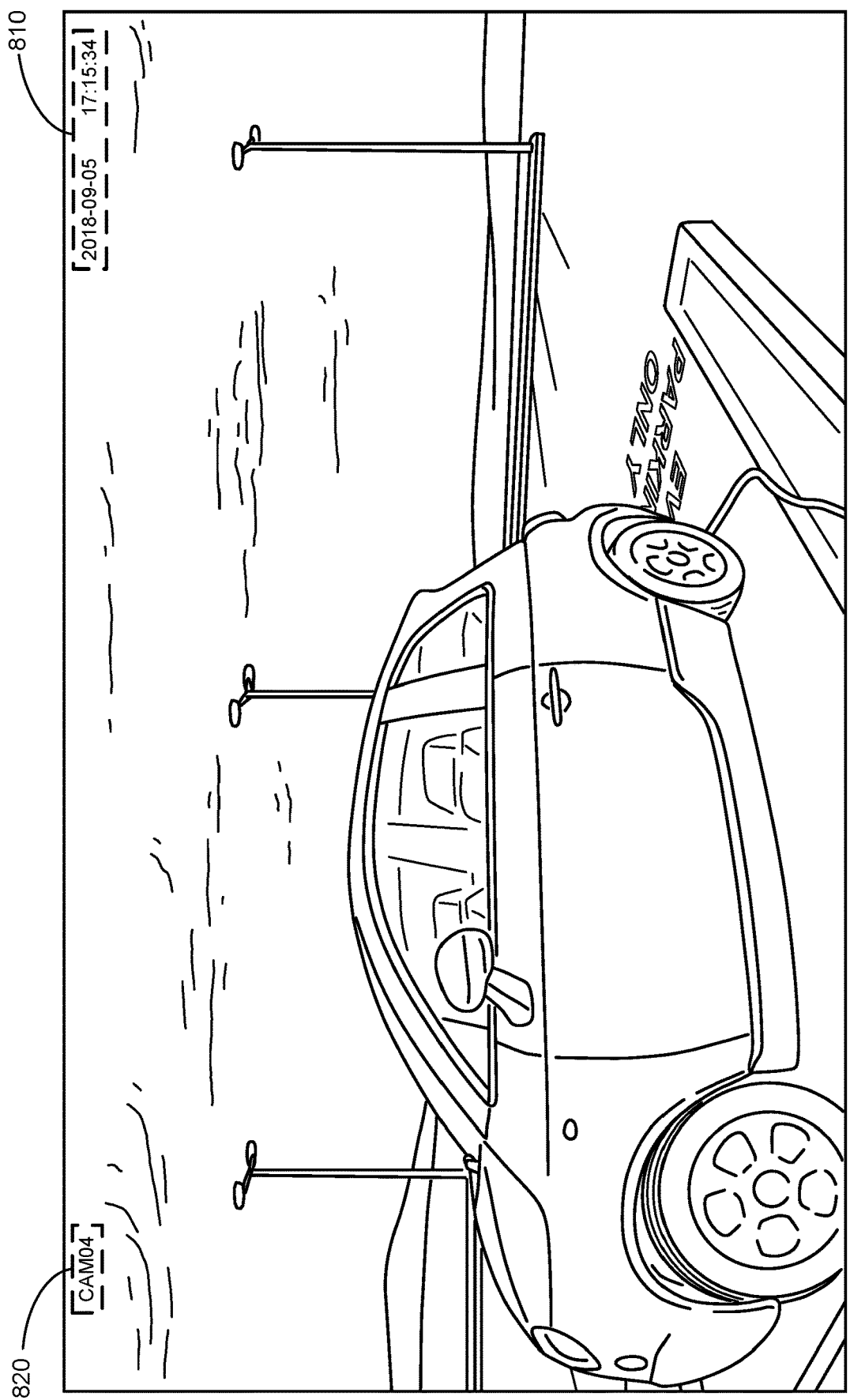
Figure 8F:
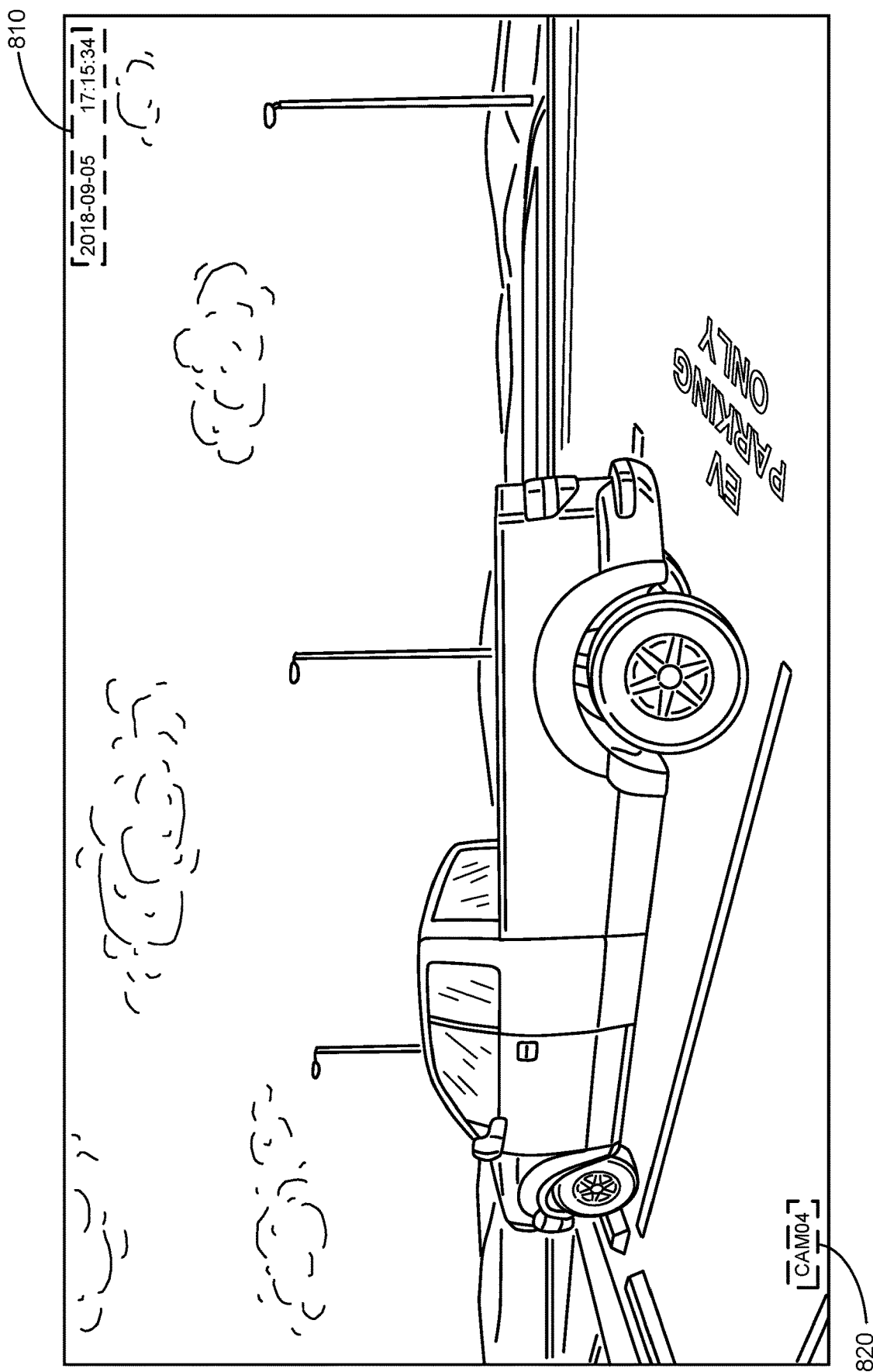
Figure 9A:
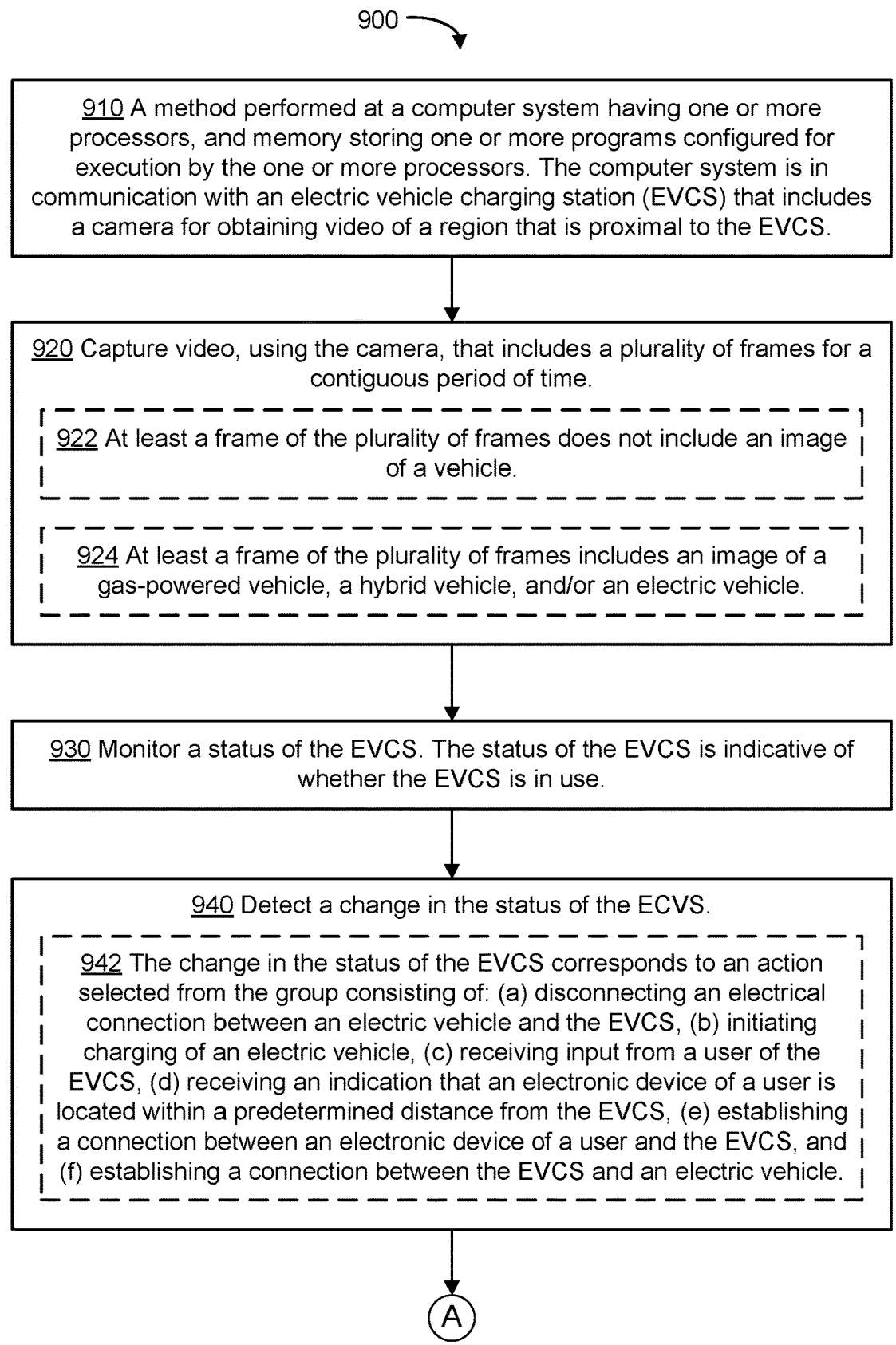
FIGS. 9A-9H illustrate a flowchart of a method of providing images of electric vehicles that are captured at a charging station for an electric vehicle, in accordance with some embodiments.
Figure 9B:
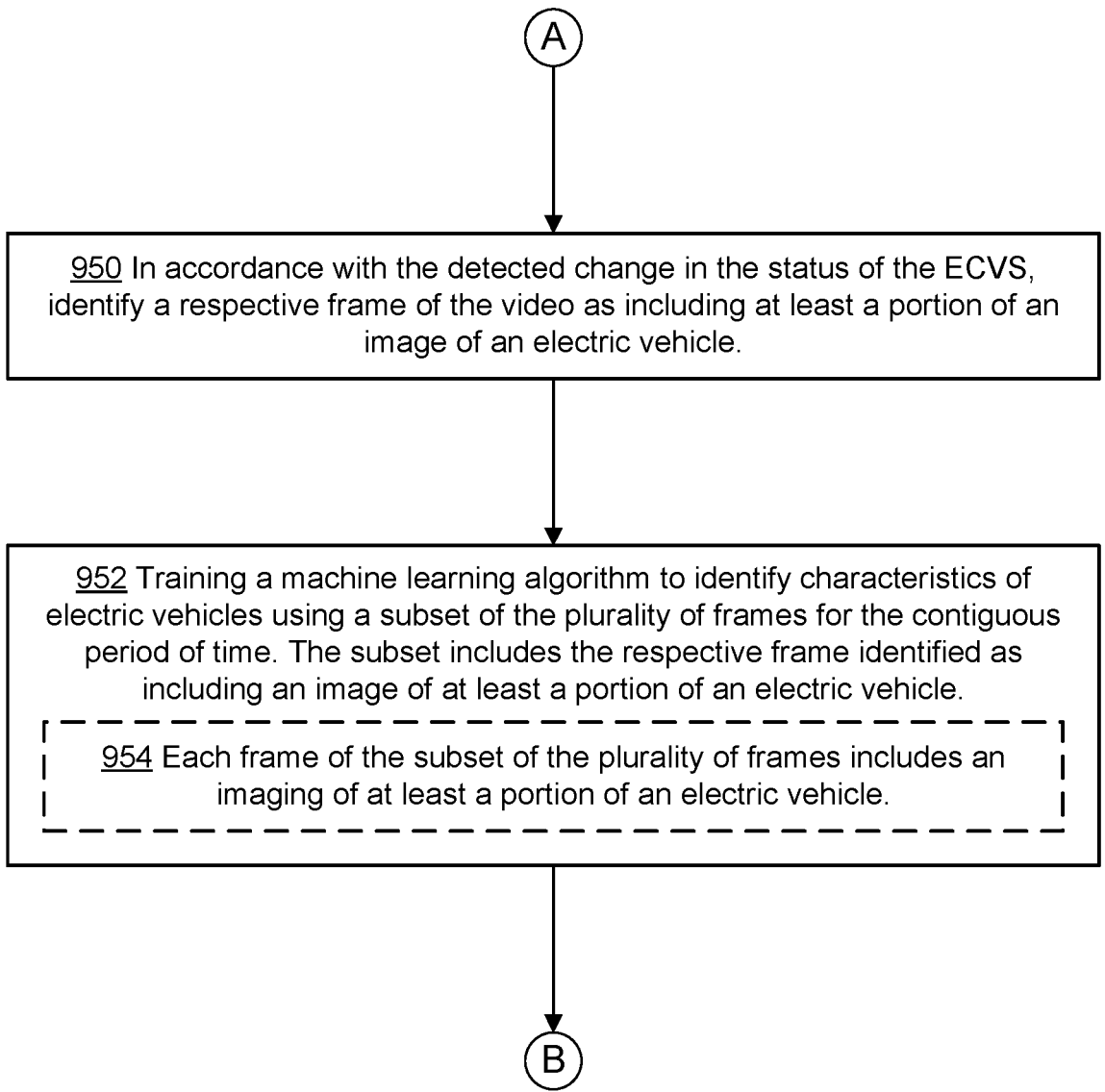
Figure 9C:
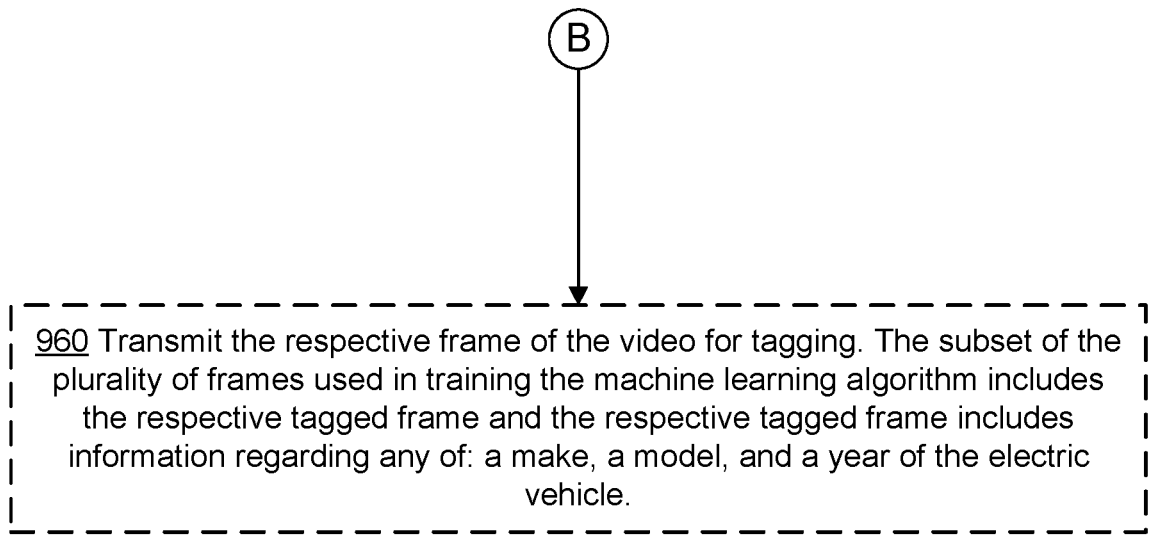
Figure 9D:
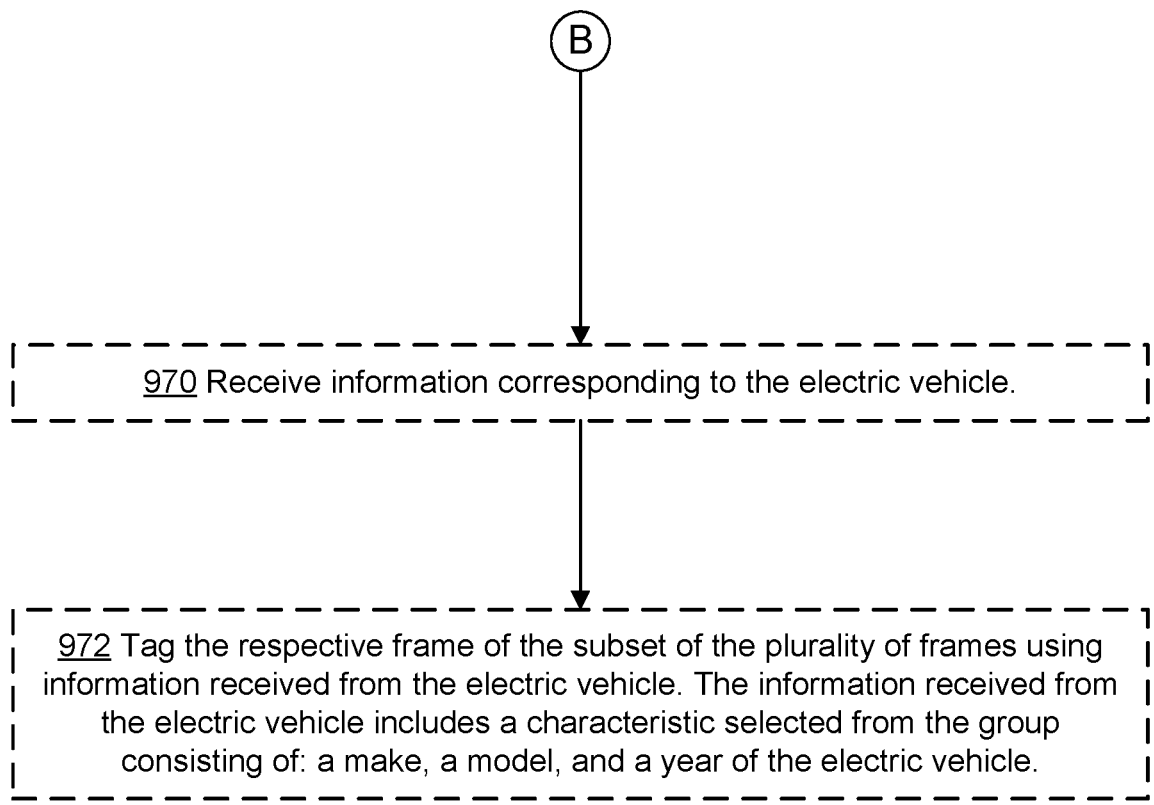
Figure 9E:
Figure 9F:
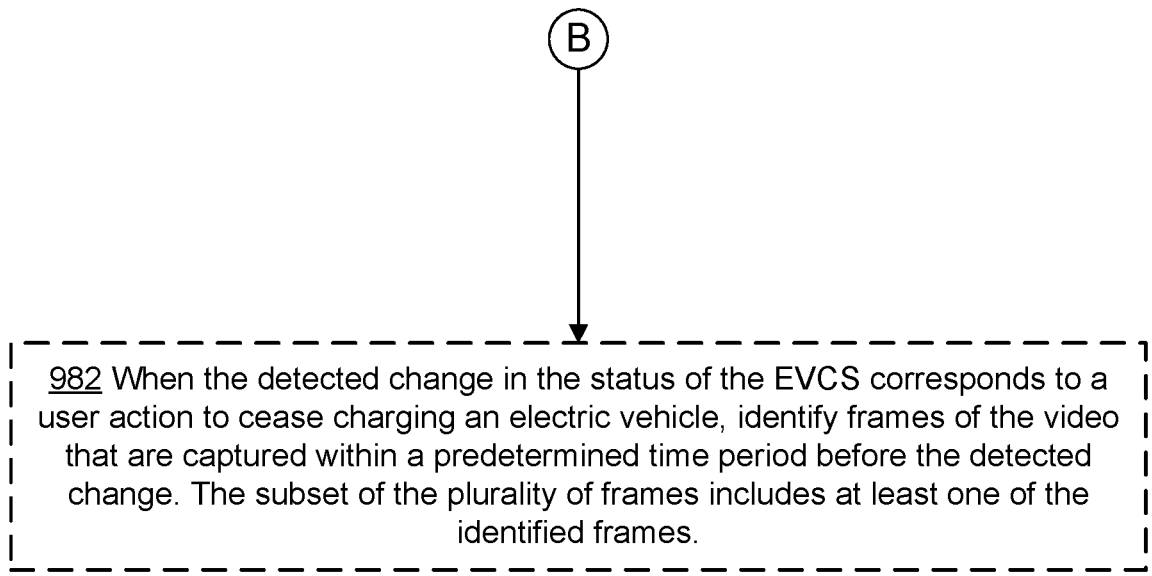
Figure 9G:
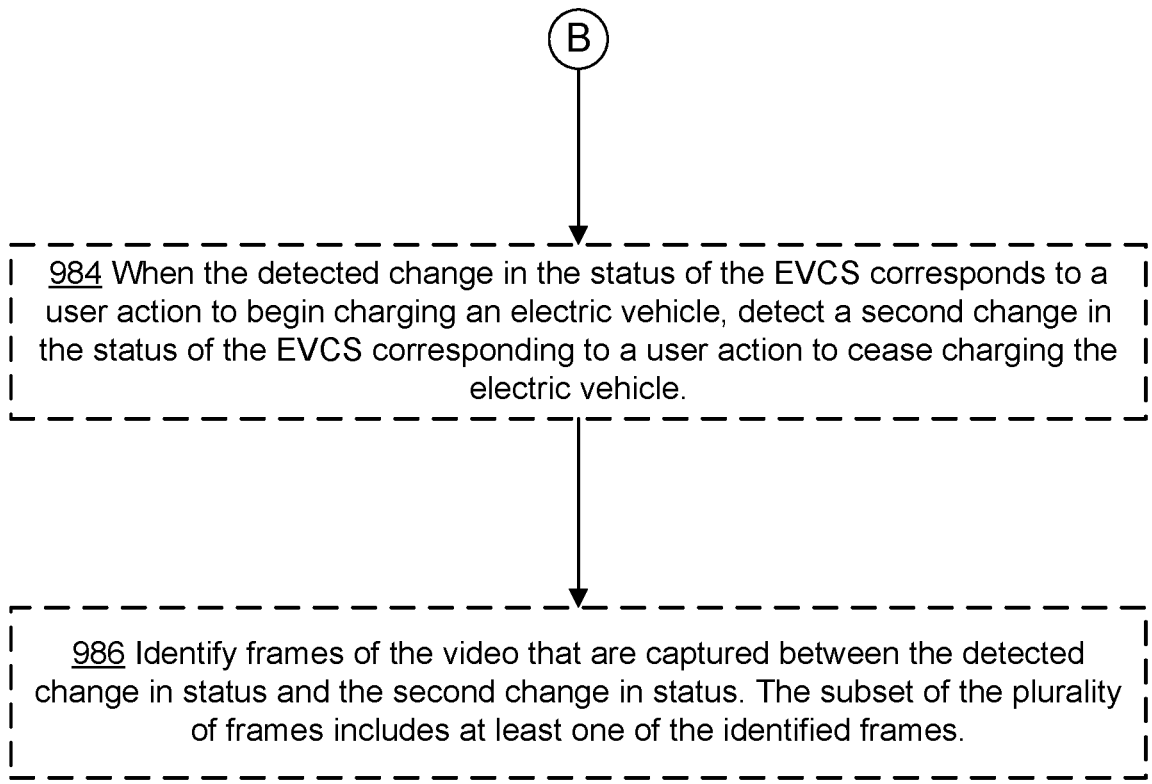
Figure 9H:
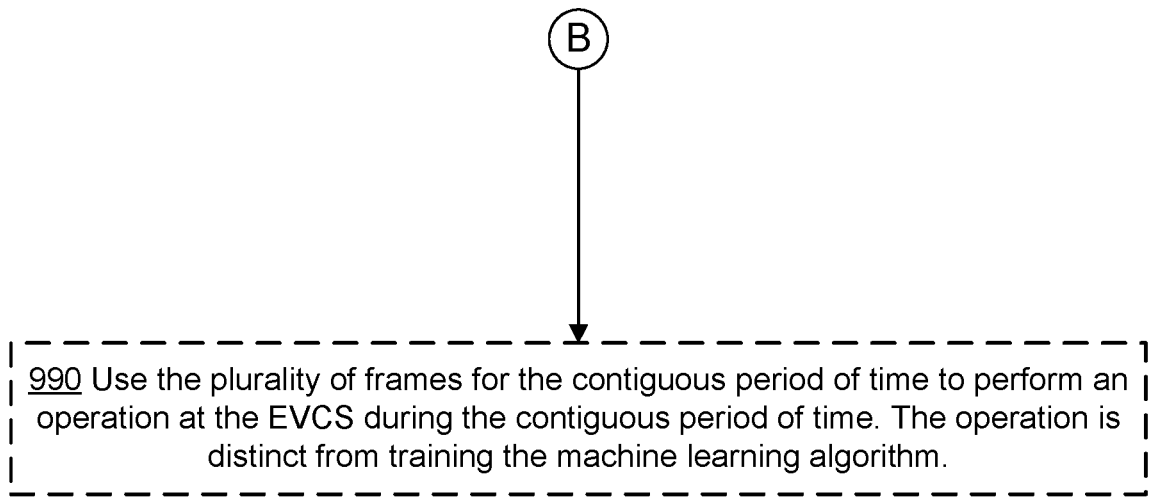

FIGS. 8A-8F illustrate examples of frames (e.g., images) captured at an electric vehicle charging station (e.g., an EVCS 100), in accordance with some embodiments. FIGS. 8A-8F are examples of video frames, such as video frames 456. In some embodiments, as shown in FIG. 8A, an image shows multiple vehicles with one vehicle disposed proximal to a camera that captured the frame (e.g., camera 206 of EVCS 100). In some embodiments, as shown in FIG. 8B, an image shows multiple vehicles but does not include a vehicle that is disposed proximal to a camera that captured the frame (e.g., camera 206 of EVCS 100). The frames include images that are obtained at different times of day, different seasons, and different locations. For example, FIGS. 8C and 8D show images that are captured a few hours apart of the same location. As shown, at 18:31:50, the weather is cloudy. In contrast, an image captured of the same location at 19:27:53 shows the vehicles in rainy weather. FIG. 8E shows an image of an electric vehicle that is occupying a parking stall corresponding to (e.g., associated with) the EVCS. FIG. 8F shows an image of a gas-powered vehicle that is occupying (illegally) an electric vehicle parking stall that is associated with the EVCS. In some embodiments, as shown, each frame includes a time stamp 810. In some embodiments, as shown, each frame includes a camera identifier 820. In some embodiments, using the methods described herein, the imagine of the electric vehicle occupying the electric vehicle stall may be used to train a machine learning model to recognize characteristics of electric vehicles, whereas the image of the gas-powered vehicle illegally occupying the electric vehicle stall is not.

FIGS. 9A-9H illustrate a flowchart of a method 900 of providing images of electric vehicles that are captured at a charging station for an electric vehicle (e.g., EVCS 100), in accordance with some embodiments. As used herein, an electric vehicle is considered any vehicle that is configured to receive a charge from an EVCS (e.g., a fully electric vehicle and/or a plug-in hybrid). The method 900 is conducted (operation 910) at a computer system (e.g., a computer system corresponding to server 120 or a computer system of EVCS 100) that is in communication with an electric vehicle charging station (e.g., EVCS 100). The computer system includes one or more processors (e.g., CPU(s) 302 or CPU(s) 404) and memory (e.g., memory 320 or memory 420). The EVCS 100 includes a camera (e.g., camera 206 of one or more sensors 402) for obtaining video of a region proximal to the EVCS 100. The method 900 includes using the camera 206 to capture (operation 920) (e.g., obtain) video that includes a plurality of frames (e.g., video frames 456) for a contiguous period of time. In some embodiments, the camera 206 captures the plurality of frames and the computer system receives (e.g., from the camera 206) the plurality of frames. For example, the computer system may obtain (e.g., receive) a plurality of video frames that are captured (e.g., obtained) by a camera that is in communication with the EVCS. The method 900 also includes monitoring (operation 930) a status of the EVCS 100. The status of the EVCS 100 is indicative of whether the EVCS 100 is in use. The method further includes detecting (operation 940) a change in the status of the EVCS 100 and in accordance with the detected change in the status of the EVCS 100, identifying (operation 950) a respective frame of the video as including an image of at least a portion of an electric vehicle. The method 900 further includes training (operation 952) a machine learning algorithm (e.g., machine learning engine 336) to identify characteristics of electric vehicles using a subset of the plurality of frames (e.g., a subset less than all, training images 340) for the contiguous period of time. The subset of frames (e.g., training images 340) includes the respective frame identified as including an image of at least a portion of an electric vehicle.

In some embodiments, when a predefined change in status (e.g., initiating charging of an electric vehicle) is detected, the method 900 also includes selecting one or more frames that are captured by the camera at a same time as (e.g., concurrent to) the detected change in status for inclusion in the subset of the plurality of frames (e.g., for training the machine learning algorithm).

In some embodiments, (operation 922) at least a frame of the plurality of frames 456 does not include an image of a vehicle. For example, while the frame shown in FIG. 8B depicts one or more vehicles in the background, the frame shown in FIG. 8B does not include an image of a vehicle in an area proximal to the EVCS 100 (e.g., in a stall or parking spot associated with the EVCS 100, in the foreground). Frames that do not include an image of a vehicle are not included in the subset of frames selected as training images 340 for training the machine learning engine 336.

In some embodiments, at least a frame of the plurality of frames 456 includes (operation 924) an image of a gas-powered vehicle, a non-plug-in hybrid vehicle, or an electric vehicle. FIG. 8F illustrates an example of a frame that includes an image of a gas-powered vehicle. In some embodiments, the images of gas-powered vehicles and/or non-plug-in hybrids are excluded from the subset of images used for training.

In some embodiments, (operation 942) the change in the status of the EVCS 100 corresponds to an action selected from the group consisting of: (a) disconnecting an electrical connection between an electric vehicle (e.g., electric vehicle 110) and the EVCS 100, (b) initiating charging of an electric vehicle 110, (c) receiving input from a user (e.g., user 114) of the EVCS 100, (d) receiving an indication that an electronic device (e.g., a user device 112) of a user 114 is located within a predetermined distance from the EVCS 100, (e) establishing a connection between an electronic device 112 of a user 114 and the EVCS 100, and (f) establishing a connection between the EVCS 100 and an electric vehicle 110. In some embodiments, the change in status of the EVCS is based on a user input detected by the EVCS. In some embodiments, the change in status of the EVCS is based on a user input detected by the vehicle (e.g., a touchscreen display inside the vehicle). In some embodiments, the change in status of the EVCS is based on a user input at a user device (e.g., user device 112) distinct from the EVCS 100 and the electric vehicle (e.g., a user input detected in an application running on the user's smartphone or other portable multifunction device.

In some embodiments, (operation 954) each frame of the subset of the plurality of frames includes an image of at least a portion of a vehicle. For example, each image of the training images 340 includes an image of at least a portion of an electric vehicle. FIGS. 8A, 8C, and 8D illustrate examples of images that include at least a portion of an electric vehicle.

In some embodiments, the subset of the plurality of frames includes images that have poor visibility. FIG. 8D illustrates an example of images that have poor visibility.

In some embodiments, each frame in the subset of frames (e.g., the training images 340) includes an image of a vehicle. In some embodiments, each frame in the subset of frames (e.g., the training images 340) includes an image of an electric vehicle.

In some embodiments, the method 900 further includes transmitting (operation 960) the respective frame of the video for tagging. The subset of the plurality of frames (e.g., training images 340) used in training the machine learning algorithm 336 includes the respective tagged frame and the respective tagged frame includes information regarding any of: a make, a model, and a year of the electric vehicle. In some embodiments, the respective frame of the video is tagged by a human operator. In some embodiments, the respective frame of the video is tagged, without human intervention, by a computer program, module, or algorithm. In some embodiments, each frame of the subset of frames is a tagged frame (e.g., each image of the training images 340 is a tagged image).

In some embodiments, the method 900 further includes forming an electrical connection between the EVCS 100 and an electric vehicle 110 (e.g., detecting an electrical connection) and receiving (operation 970) information corresponding to the electric vehicle 110 and tagging (operation 972) the respective frame of the subset of the plurality of frames using information received from the electric vehicle. The information received from the electric vehicle includes a characteristic selected from the group consisting of: a make, a model, and a year of the electric vehicle. For example, in response to commencing charging an electric vehicle 110, the EVCS 100 may also receive, either through wired or wireless communications, the make, model, and/or year of the electric vehicle 110. In some embodiments, the one or more characteristics of the electric vehicle 110 are transmitted via a charging cable or electrical connection. In some embodiments, the one or more characteristics of the electric vehicle 110 may be inferred or determined from a user profile of the user 114 of the EVCS 100. The information regarding the electric vehicle 110 can be associated with (e.g., tied to, linked to) an image captured by the one or more cameras 206 as well as a user profile or user identification. A computer system (such as server system 120) can associate the information regarding the electric vehicle with the captured images (e.g., video frames). For example, the information corresponding to the electric vehicle 110 may be stored in database 338 of the server system 120 or in a database 450 of the EVCS 100. In another example, the computer system may associate one or more captured video frames with a user profile. In the case where information regarding the make, model, or year of an electric vehicle 110 shown in a video frame captured by the EVCS 100 is not known, the computer system may use tagging information stored in metadata of the video frame to update a user profile associated with the EVCS 100 at the time that the video frame is captured so that the user profile includes information regarding the make, model, and/or year of the electric vehicle 110. Additionally, the computer system may use information from the training image that identifies the vehicle. For example, if a training image shows the license plate of the electric vehicle, the computer system may obtain the license plate number of the electric vehicle and use publicly available records (such as from the Department of Motor Vehicles) to look up the make and model of the electric vehicle.

In some embodiments, when the detected change in the status of the EVCS 100 corresponds to a user action to begin charging an electric vehicle, the method 900 further includes identifying (operation 980) frames 456 of the video that are captured within a predetermined time period after the detected change. The subset of the plurality of frames (e.g., training images 340) includes at least one of the identified frames.

In some embodiments, when the detected change in the status of the EVCS 100 corresponds to a user action to cease charging an electric vehicle, the method 900 further includes identifying (operation 982) frames 456 of the video that are captured within a predetermined time period before the detected change. The subset of the plurality of frames (e.g., training images 340) includes at least one of the identified frames.

In some embodiments, when the detected change in the status of the EVCS 100 corresponds to a user action to begin charging an electric vehicle, the method 900 further includes detecting (operation 984) a second change in the status of the EVCS 100 that corresponds to a user action to cease charging the electric vehicle 110. The method 900 also includes identifying (operation 986) frames of the video that are captured between the detected change in status and the second change in status (e.g., identify frames captured between beginning to charge the electric vehicle 110 and ceasing to charge the electric vehicle 110). The subset of the plurality of frames includes at least one of the identified frames.

In some embodiments, the method 900 further includes processing the respective frame of the video by removing or censoring at least a portion of the image (e.g., a training image 340) of the electric vehicle 110 that includes information that can be used to identify an operator of the electric vehicle 110. For example, faces of a driver or one or more passengers of an electric vehicle 110 may be blurred to protect their identities.

In some embodiments, the method 900 further includes using (operation 990) the plurality of frames 456 for the contiguous period of time to perform an operation at the EVCS 100 during the contiguous period of time. The operation is distinct from (e.g., different from, not the same as) training the machine learning algorithm. For example, the EVCS 100 may use a video frame 456 that includes an image of an electric vehicle to select (e.g., determine) which advertisements to display on a display 210 of the EVCS 100 and to display the selected advertisements on the display 210.

FIGS. 10A-10C illustrate a flowchart of a method 1000 of labeling (e.g., tagging) images of electric vehicles that are captured at a charging station for an electric vehicle (e.g., EVCS 100), in accordance with some embodiments. As used herein, an electric vehicle is considered any vehicle that is configured to receive a charge from an EVCS (e.g., a fully electric vehicle and/or a plug-in hybrid). The method 1000 is conducted (1002) at a computer system (e.g., a computer system corresponding to server 120 or a computer system of EVCS 100) that is in communication with an electric vehicle charging station (e.g., EVCS 100). The computer system includes one or more processors (e.g., CPU(s) 302 or CPU(s) 404) and memory (e.g., memory 320 or memory 420). The EVCS 100 includes a camera (e.g., camera 206 of one or more sensors 402) for obtaining images of a region proximal to the EVCS 100. Note that method 1000 may share any of the operations or features described elsewhere in this document, such as with respect to method 900 (FIGS. 9A-9H). For brevity, such details are not repeated here.

Method 1000 includes capturing (1004), using the camera, a plurality of images of electric vehicles (e.g., where capturing may include receive an image captured by an EVCS remote from the computer system). Each image in the plurality of images is an image of a respective electric vehicle. In some embodiments, the plurality of images comprises frames of video (e.g., as described with reference to method 900). In some embodiments, the frames of video are selected according to method 900. In some embodiments, the plurality of images comprises still images (e.g., that are captured based on a trigger from a sensor on the EVCS, such as a motion sensor). In some embodiments, the images are RGB images.

Method 1000 includes, for each respective image of the plurality of images of electric vehicles (1006), performing operations 1008 through 1022.

To that end, method 100 includes determining (1008), without user intervention, a characteristic of the respective electric vehicle. In some embodiments, the characteristic includes (1010) at least one of a make, model, and year of the electric vehicle. In some embodiments, the characteristic includes each of the make, model, and year of the electric vehicle (e.g., the image is determined to be a particular model from a particular manufacturer in a particular year).

In some embodiments, the characteristic of the respective electric vehicle is (1012) determined from information received by the EVCS. For example, in some embodiments, the characteristic of the respective electric vehicle is (1014) determined from information received through a charging cable of the EVCS (e.g., a CCS1 connection). For example, using certain charging gun standards, the EVCS creates a network bridge to the electric vehicle when the electric vehicle is plugged-in. As part of creating the network bridge, the EVCS receives a media access control (MAC) address for the electric vehicle. In some circumstances, the manufacturer of the electric vehicle can be determined from the MAC address for the electric vehicle (e.g., certain electric vehicle manufacturers have reserved certain ranges of MAC addresses, such that a look-up may be performed to determine which manufacturer is associated with a particular MAC address).

In some embodiments, the EVCS includes a plurality of sensors and the characteristic of the respective electric vehicle is (1016) determined from information received by the plurality of sensors. In some embodiments, the plurality of sensors includes one or more of the group consisting of: an ultrasound sensor, a magnetometer, a scale, a depth sensor, a passive infrared (PIR) sensor, a heat infrared (IR) sensor, a proximity sensor, a radar sensor, and a LiDAR sensor. For example, in some embodiments, determining the characteristic of the respective electric vehicle includes (1018), prior to training the first machine learning algorithm (operation 1024, described below), providing the information received by the plurality of sensors to a second machine learning algorithm. The second machine learning algorithm is configured to output the characteristic of the respective electric vehicle. More particularly, in some embodiments, the second machine learning algorithm is a neural network trained to determine the characteristic of the electric vehicle using information from each of the plurality of sensors. Because the second machine algorithm uses information from a plurality of sensors, the second machine learning algorithm is generally quite accurate, and can be used to automatically tag (e.g., label) images. The automatically tagged images can then be used to train a neural network to determine the same characteristic of electric vehicles using information from only a subset of the sensors (e.g., using only magnetometer data).

In some embodiments, the characteristic of the respective electric vehicle is determined (1020), in response to a user initiating a charging process at the EVCS, using information from an account associated with the user. For example, in some embodiments, the user initiates a charging process at the EVCS by checking-in to the EVCS using EVCS application 538 running on their mobile device. Account information is stored by the computer system (e.g., server 120) so that, when the user checks in to the charging station using the EVCS application 538, server system 120 is able to perform a look-up to determine the characteristic of the vehicle.

The method 1000 includes tagging (1022), without user intervention, the respective image with the characteristic of the respective electric vehicle. In some embodiments tagging (also referred to as labelling) the respective image with the characteristic of the respective electric vehicle includes storing, as metadata associated with the respective image, information indicating the characteristic of the respective vehicle.

In some embodiments, the method 100 includes training (1024) a first machine learning algorithm to identify the characteristic of other electric vehicles using the tagged plurality of images. For example, in some embodiments, the EVCS includes (1026) a plurality of sensors. Training the first machine learning algorithm comprises training the first machine learning algorithm to identify the characteristic of electric vehicles using information from a first subset, less than all, of the plurality of sensors. In some embodiments, the method 1000 includes training (1030) a third machine learning algorithm to identify the characteristic of other electric vehicles using information from a second subset, less than all, of the plurality of sensors, wherein the second subset is different from the first subset. More particularly, the automatically tagged images can be used to train a plurality of machine learning algorithms (e.g., neural networks, correlation matrices, etc.) using information from different sensors or different combinations of sensors that are present on the EVCS. This may be useful in contexts in which electric vehicles need to be identified but only a subset of the sensor types are available for the identification (e.g., a municipality may want to identify electric vehicles that pass a toll booth, but the toll booth may have only a subset of the sensors that are available to the EVCS).

In some embodiments, the EVCS includes (1028) a plurality of sensors. The method 1000 includes storing, as metadata associated with each respective image of the plurality of images, information from the plurality of sensors corresponding to the respective image. For example, data from the plurality of sensors that is obtained in temporal proximity to the capture of the respective image is stored in association (e.g., as metadata) with the respective image.

In some embodiments, the method 1000 includes storing (1032) each respective image of the plurality of images with a tag identifying the characteristic of the respective electric vehicle. In such embodiments, the method 1000 includes receiving (1034) a request for images of electric vehicles having a particular value of the characteristic of the respective electric vehicle. In some embodiments, the method 1000 includes providing (1036) a subset, less than all, of the plurality of images, wherein the subset consists of images having the particular value of the characteristic of the electric vehicle. For example, storing automatically tagged images from EVCSs allows the computer system to service request from, e.g., vehicle manufacturers, for images of their vehicles. This allows vehicle manufacturers to analyze how their vehicles are being used (e.g., what types of tires drivers are putting on their vehicles) and to analyze various quality issues that may arise with their vehicles (e.g., how paint from a particular model from a particular year is wearing).

It will be understood that, although the terms first, second, etc., are, in some instances, used herein to describe various elements, these elements should not be limited by these terms. These terms are only used to distinguish one element from another. For example, a first widget could be termed a second widget, and, similarly, a second widget could be termed a first widget, without departing from the scope of the various described embodiments. The first widget and the second widget are both widget, but they are not the same condition unless explicitly stated as such.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   at a computer system comprising one or more processors, and memory, wherein the computer system is in communication with an electric vehicle charging station (EVCS), the EVCS comprising a camera for obtaining images of a region proximal to the EVCS:
      capturing, using the camera, a plurality of images of electric vehicles, each image in the plurality of images being an image of a respective electric vehicle;
      for each respective image of the plurality of images of electric vehicles:
         determining, without user intervention, a characteristic of the respective electric vehicle;
         tagging, without user intervention, the respective image with the characteristic of the respective electric vehicle; and
      training a first machine learning algorithm to identify the characteristic of other electric vehicles using the tagged plurality of images.

2. The method of claim 1, wherein the characteristic of the respective electric vehicle is determined from information received by the EVCS.

3. The method of claim 2, wherein the characteristic of the respective electric vehicle is determined from information received through a charging cable of the EVCS.

4. The method of claim 1, wherein the EVCS includes a plurality of sensors and the characteristic of the respective electric vehicle is determined from information received by the plurality of sensors.

5. The method of claim 4, wherein determining the characteristic of the respective electric vehicle includes, prior to training the first machine learning algorithm, providing the information received by the plurality of sensors to a second machine learning algorithm, wherein the second machine learning algorithm is configured to output the characteristic of the respective electric vehicle.

6. The method of claim 1, wherein:
   the EVCS includes a plurality of sensors, and
   the method further comprises, storing, as metadata associated with each respective image of the plurality of images, information from the plurality of sensors corresponding to the respective image.

7. The method of claim 1, wherein the EVCS includes a plurality of sensors and training the first machine learning algorithm comprises training the first machine learning algorithm to identify the characteristic of electric vehicles using information from a first subset, less than all, of the plurality of sensors.

8. The method of claim 7, further comprising, training a third machine learning algorithm to identify the characteristic of other electric vehicles using information from a second subset, less than all, of the plurality of sensors, wherein the second subset is different from the first subset.

9. The method of claim 1, wherein the characteristic of the respective electric vehicle is determined, in response to a user initiating a charging process at the EVCS, using information from an account associated with the user.

10. The method of claim 1, further comprising:
- storing each respective image of the plurality of images with a tag identifying the characteristic of the respective electric vehicle;
- receiving a request for images of electric vehicles having a particular value of the characteristic of the respective electric vehicle; and
- providing a subset, less than all, of the plurality of images, wherein the subset consists of images having the particular value of the characteristic of the electric vehicle.

11. The method of claim 1, wherein the characteristic includes at least one of a make, model, and year of the electric vehicle.

12. A computer system that is in communication with an electric vehicle charging station (EVCS), the EVCS comprising a camera for obtaining video of a region proximal to the EVCS, the computer system comprising:
- one or more processors;
- memory storing one or more programs, the one or more programs including instructions for:
  - capturing, using the camera, a plurality of images of electric vehicles, each image in the plurality of images being an image of a respective electric vehicle;
  - for each respective image of the plurality of images of electric vehicles:
    - determining, without user intervention, a characteristic of the respective electric vehicle;
    - tagging, without user intervention, the respective image with the characteristic of the respective electric vehicle; and
  - training a first machine learning algorithm to identify the characteristic of other electric vehicles using the tagged plurality of images.

13. The computer system of claim 12, wherein the characteristic of the respective electric vehicle is determined from information received by the EVCS.

14. The computer system of claim 13, wherein the characteristic of the respective electric vehicle is determined from information received through a charging cable of the EVCS.

15. The computer system of claim 12, wherein the EVCS includes a plurality of sensors and the characteristic of the respective electric vehicle is determined from information received by the plurality of sensors.

16. The computer system of claim 15, wherein determining the characteristic of the respective electric vehicle includes, prior to training the first machine learning algorithm, providing the information received by the plurality of sensors to a second machine learning algorithm, wherein the second machine learning algorithm is configured to output the characteristic of the respective electric vehicle.

17. The computer system of claim 12, wherein:
- the EVCS includes a plurality of sensors, and
- the one or more programs including instructions for storing, as metadata associated with each respective image of the plurality of images, information from the plurality of sensors corresponding to the respective image.

18. The computer system of claim 12, wherein the EVCS includes a plurality of sensors and training the first machine learning algorithm comprises training the first machine learning algorithm to identify the characteristic of electric vehicles using information from a first subset, less than all, of the plurality of sensors.

19. The computer system of claim 18, wherein the one or more programs including instructions for training a third machine learning algorithm to identify the characteristic of other electric vehicles using information from a second subset, less than all, of the plurality of sensors, wherein the second subset is different from the first subset.

20. A non-transitory computer readable storage medium storing including instructions that, when executed by one or more processors of a computer system that is in communication with an electric vehicle charging station (EVCS), the EVCS comprising a camera for obtaining video of a region proximal to the EVCS, cause the computer system to perform operations comprising:
- capturing, using the camera, a plurality of images of electric vehicles, each image in the plurality of images being an image of a respective electric vehicle;
- for each respective image of the plurality of images of electric vehicles:
  - determining, without user intervention, a characteristic of the respective electric vehicle;
  - tagging, without user intervention, the respective image with the characteristic of the respective electric vehicle; and
- training a first machine learning algorithm to identify the characteristic of other electric vehicles using the tagged plurality of images.

* * * * *